(12) United States Patent
Rolicki et al.

(10) Patent No.: US 11,292,499 B2
(45) Date of Patent: Apr. 5, 2022

(54) MANEUVERABLE STROLLERS

(71) Applicant: Kolcraft Enterprises, Inc., Chicago, IL (US)

(72) Inventors: Peter Rolicki, Wheeling, IL (US); Liviu Iftinca, Chicago, IL (US); Wes Thomas, Kenosha, WI (US); Ted Bretschger, Chicago, IL (US)

(73) Assignee: Kolcraft Enterprises, Inc., Chicago, IL (US)

( * ) Notice: Subject to any disclaimer, the term of this patent is extended or adjusted under 35 U.S.C. 154(b) by 244 days.

(21) Appl. No.: 16/752,985

(22) Filed: Jan. 27, 2020

(65) Prior Publication Data
US 2020/0198682 A1 Jun. 25, 2020

Related U.S. Application Data

(63) Continuation of application No. 15/042,679, filed on Feb. 12, 2016, now Pat. No. 10,556,610, which is a
(Continued)

(51) Int. Cl.
*B62B 7/00* (2006.01)
*B62B 7/04* (2006.01)
(Continued)

(52) U.S. Cl.
CPC ............... *B62B 7/008* (2013.01); *B62B 7/04* (2013.01); *B62B 7/08* (2013.01); *B62B 9/02* (2013.01);
(Continued)

(58) Field of Classification Search
CPC .. B62B 7/008; B62B 7/06; B62B 9/00; B62B 7/04; B62B 9/02; B62B 3/008
See application file for complete search history.

(56) References Cited

U.S. PATENT DOCUMENTS

| | | |
|---|---|---|
| 1,239,498 A | 9/1917 | Madigan |
| 1,322,788 A | 11/1919 | Hazelton |
| (Continued) | | |

FOREIGN PATENT DOCUMENTS

| | | |
|---|---|---|
| CN | 86204542 | 12/1986 |
| CN | 2776791 | 5/2006 |
| (Continued) | | |

OTHER PUBLICATIONS

State Intellectual Propert Office of China, "First Notification of Office Action," issued in connection with Chinese Patent Application No. 201910525929.9, dated Mar. 3, 2021 (11 pages).
(Continued)

*Primary Examiner* — Hau V Phan
(74) *Attorney, Agent, or Firm* — Hanley, Flight & Zimmerman, LLC

(57) ABSTRACT

Maneuverable strollers are disclosed. An example stroller includes a frame that includes an upper frame support, an intermediate frame support, a lower frame support, and a handle coupled to the upper frame support. The example stroller also includes a front wheel coupled to the lower frame support, an intermediate wheel having an axis of rotation, and a rear wheel. The intermediate wheel is located between the front wheel and the rear wheel. The intermediate wheel and the rear wheel are coupled to upper frame support via the intermediate frame support. The example stroller also includes a pivot axis, where the intermediate frame support is coupled to the upper frame support about the pivot axis, and the pivot axis is offset above and forward to the axis of rotation.

20 Claims, 24 Drawing Sheets

Related U.S. Application Data continuation of application No. 14/508,827, filed on Oct. 7, 2014, now Pat. No. 9,260,127, which is a continuation of application No. 13/828,344, filed on Mar. 14, 2013, now Pat. No. 8,882,134.

(60) Provisional application No. 61/749,728, filed on Jan. 7, 2013.

(51) Int. Cl.
| | |
|---|---|
| *B62B 7/08* | (2006.01) |
| *B62B 9/20* | (2006.01) |
| *B62B 9/02* | (2006.01) |
| *B62B 7/06* | (2006.01) |
| *B62B 5/06* | (2006.01) |
| *B62B 9/08* | (2006.01) |
| *B62B 3/00* | (2006.01) |

(52) U.S. Cl.
CPC .............. *B62B 9/20* (2013.01); *B62B 3/008* (2013.01); *B62B 5/064* (2013.01); *B62B 5/065* (2013.01); *B62B 7/064* (2013.01); *B62B 9/082* (2013.01); *B62B 2301/08* (2013.01); *B62B 2501/00* (2013.01); *Y10T 29/49828* (2015.01)

(56) References Cited

U.S. PATENT DOCUMENTS

| | | | |
|---|---|---|---|
| 1,418,929 | A | 6/1922 | House |
| 1,832,770 | A | 11/1931 | Hallowell |
| 3,173,396 | A | 3/1965 | Bradov |
| 3,831,960 | A | 8/1974 | Walton |
| 4,310,167 | A | 1/1982 | McLaurin |
| 4,433,869 | A | 2/1984 | Payne, Jr. et al. |
| 4,893,826 | A | 1/1990 | Ward et al. |
| 4,936,629 | A | 6/1990 | Young |
| 5,022,669 | A | 6/1991 | Johnson |
| D326,748 | S | 6/1992 | Kirk |
| 5,158,319 | A * | 10/1992 | Norcia .................. B62B 9/00 280/43.17 |
| 5,301,968 | A | 4/1994 | Ward et al. |
| 5,417,449 | A | 5/1995 | Shamie |
| 5,556,118 | A | 9/1996 | Kern et al. |
| 5,581,843 | A | 12/1996 | Purnell |
| 5,653,460 | A | 8/1997 | Fogarty |
| 5,664,795 | A | 9/1997 | Haung |
| 5,722,594 | A | 3/1998 | Farr et al. |
| 6,086,087 | A | 7/2000 | Yang |
| D431,798 | S | 10/2000 | Strycker et al. |
| 6,135,222 | A | 10/2000 | Fumkawa |
| 6,267,406 | B1 | 7/2001 | Huang |
| 6,312,005 | B1 | 11/2001 | Lin |
| 6,394,470 | B1 | 5/2002 | Shirai |
| 6,454,286 | B1 | 9/2002 | Hosino |
| 6,540,239 | B2 | 4/2003 | Lee, Jr. |
| 6,698,788 | B2 | 3/2004 | Yang |
| 6,702,306 | B1 | 3/2004 | Ockwell |
| 6,877,762 | B2 | 4/2005 | Yamazaki |
| 6,935,652 | B2 | 8/2005 | Fair et al. |
| 6,938,906 | B1 | 9/2005 | Black |
| 6,981,709 | B2 | 1/2006 | Saint |
| 7,059,625 | B2 | 6/2006 | Horacek |
| 7,261,308 | B2 | 8/2007 | Gwisdalla et al. |
| 7,338,122 | B2 | 3/2008 | Hei et al. |
| 7,481,439 | B2 | 1/2009 | Thompson |
| 7,497,449 | B2 | 3/2009 | Logger |
| 7,559,606 | B2 | 7/2009 | Hei et al. |
| 7,597,332 | B2 | 10/2009 | Thompson |
| 7,740,313 | B1 | 6/2010 | Hei et al. |
| 7,770,970 | B2 | 8/2010 | Hei et al. |
| 7,780,184 | B2 | 8/2010 | Ehrenreich et al. |
| 7,789,413 | B2 | 9/2010 | Hei et al. |
| 7,832,756 | B2 | 11/2010 | Storm |
| 7,854,435 | B2 | 12/2010 | Campbell |
| 7,887,129 | B2 | 2/2011 | Hei et al. |
| 7,891,732 | B2 | 2/2011 | Hei et al. |
| 7,938,433 | B2 | 5/2011 | Pike et al. |
| 7,971,897 | B2 | 7/2011 | Pike et al. |
| 7,992,889 | B2 | 8/2011 | Ehrenreich et al. |
| 8,029,007 | B2 | 10/2011 | Jones et al. |
| 8,070,179 | B2 | 12/2011 | Pike et al. |
| 8,128,118 | B2 | 3/2012 | Friisdahl et al. |
| 8,128,119 | B2 | 3/2012 | Saville et al. |
| 8,157,273 | B2 | 4/2012 | Bar-Lev |
| 8,262,107 | B2 | 9/2012 | Tuckey et al. |
| 8,276,935 | B2 | 10/2012 | Minato et al. |
| 8,882,134 | B2 | 11/2014 | Rolicki et al. |
| 9,056,622 | B2 | 6/2015 | Thomas et al. |
| 9,260,127 | B2 | 2/2016 | Rolicki et al. |
| 10,556,610 | B2 | 2/2020 | Rolicki et al. |
| 2002/0125662 | A1 | 9/2002 | Magness |
| 2004/0011884 | A1 | 1/2004 | Wilt |
| 2005/0253348 | A1 | 11/2005 | Gwisdalla |
| 2005/0253431 | A1 | 11/2005 | Hei et al. |
| 2005/0264064 | A1 | 12/2005 | Hei et al. |
| 2006/0290107 | A1 | 12/2006 | Powers |
| 2007/0001410 | A1 | 1/2007 | Thompson |
| 2007/0075510 | A1 | 4/2007 | Hei et al. |
| 2007/0114738 | A1 | 5/2007 | Jones et al. |
| 2007/0257526 | A1 | 11/2007 | Hei et al. |
| 2008/0042476 | A1 | 2/2008 | Hei et al. |
| 2008/0224451 | A1 | 9/2008 | Vegt |
| 2009/0072520 | A1 | 3/2009 | Ehrenreich et al. |
| 2009/0302556 | A1 | 12/2009 | White et al. |
| 2009/0302578 | A1 | 12/2009 | White et al. |
| 2010/0032925 | A1 | 2/2010 | Ehrenreich et al. |
| 2010/0066058 | A1 * | 3/2010 | Norcia .................. B62B 9/00 280/642 |
| 2010/0072731 | A1 | 3/2010 | Thompson |
| 2010/0109270 | A1 | 5/2010 | Hei et al. |
| 2010/0109293 | A1 | 5/2010 | Friisdahl et al. |
| 2010/0140902 | A1 * | 6/2010 | Zehfuss ................ B62B 7/008 280/650 |
| 2010/0148553 | A1 | 6/2010 | Hei et al. |
| 2010/0314925 | A1 | 12/2010 | Hei et al. |
| 2011/0012325 | A1 * | 1/2011 | Gower .................. B62B 7/06 280/648 |
| 2011/0074195 | A1 | 3/2011 | Hei et al. |
| 2011/0101742 | A1 | 5/2011 | Hei et al. |
| 2011/0115264 | A1 | 5/2011 | Hei et al. |
| 2012/0080244 | A1 | 4/2012 | Hou |
| 2012/0181779 | A1 | 7/2012 | Tsukada et al. |
| 2013/0154215 | A1 | 6/2013 | Thomas et al. |
| 2014/0191483 | A1 | 7/2014 | Rolicki et al. |
| 2015/0021872 | A1 | 1/2015 | Rolicki et al. |
| 2016/0159385 | A1 | 6/2016 | Rolicki et al. |

FOREIGN PATENT DOCUMENTS

| | | |
|---|---|---|
| CN | 101284543 | 10/2008 |
| CN | 201082720 | 7/2009 |
| CN | 101678852 | 3/2010 |
| CN | 102256856 | 11/2011 |
| CN | 103328305 | 9/2013 |
| CN | 103909960 | 7/2014 |
| DE | 202009000172 | 4/2009 |
| EP | 1970283 | 9/2008 |
| GB | 2223717 | 4/1990 |
| JP | 63134365 | 6/1988 |
| JP | 10291480 | 11/1998 |
| JP | 2002087276 | 3/2002 |
| JP | 2006219060 | 8/2006 |
| WO | WO0074997 | 12/2000 |
| WO | WO2007033562 | 3/2007 |
| WO | WO2012075157 | 6/2012 |

OTHER PUBLICATIONS

United States Patent and Trademark Office, "Non-Final Office Action," issued in connection with U.S. Appl. No. 13/817,401, dated Jun. 26, 2013, 8 pages.

(56) References Cited

OTHER PUBLICATIONS

United States Patent and Trademark Office, "Final Rejection," issued in connection with U.S. Appl. No. 13/817,401, dated Dec. 24, 2013, 14 pages.
United States Patent and Trademark Office, "Non-Final Office Action," issued in connection with U.S. Appl. No. 13/817,401, dated Jun. 12, 2014, 10 pages.
United States Patent and Trademark Office, "Final Rejection," issued in connection with U.S. Appl. No. 13/817,401, dated Oct. 22, 2014, 10 pages.
Patent Cooperation Treaty, "International Preliminary Report on Patentability," issued in connection with International Patent Application No. PCT/US2011/062669, dated Jun. 4, 2013, 9 pages.
Patent Cooperation Treaty, "International Search Report," issued in connection with International Patent Application No. PCT/US2011/062669, dated Jun. 29, 2012, 3 pages.
Patent Cooperation Treaty, "Written Opinion of the International Searching Authority," issued in connection with International Patent Application No. PCT/US2011/062669, dated Jun. 29, 2012, 8 pages.
Glaro Products, "Glaro Glider Ultimate Bellman Carts," product description, Feb. 22, 2011, 7 pages.
Kegworks, "Six Wheel Warehouse Cart," product description, Feb. 22, 2011, 3 pages.
Global Industrial, "Little Giant 6-Wheel Platform Truck 24x48," product description, Feb. 22, 2011, 3 pages.
United States Patent and Trademark Office, "Non-Final Office Action," issued in connection with U.S. Appl. No. 13/828,344, dated Dec. 10, 2013, 9 pages.
United States Patent and Trademark Office, "Final Rejection," issued in connection with U.S. Appl. No. 13/828,344, dated May 8, 2014, 8 pages.
United States Patent and Trademark Office, "Notice of Allowance," issued in connection with U.S. Appl. No. 13/828,344, dated Jul. 8, 2014, 5 pages.
State Intellectual Property Office of China, "Notice of Grant," issued in connection with Application No. 201180057709.X, dated Dec. 1, 2015, 5 pages.
The State Intellectual Property Office of the People's Republic of China, "First Office Action," issued in connection with Application No. 201410058323.6, dated Sep. 6, 2015, 14 pages.
The State Intellectual Property Office of China, "First Notification of Office Action," issued in connection with Chinese Application No. 201180057709.X, dated Mar. 27, 2015, with English translation, 20 pages.
United States Patent and Trademark Office. "Notice of Allowance," issued in connection with U.S. Appl. No. 13/817,401, dated Feb. 12, 2015, 17 pages.
United States Patent and Trademark Office. "Non-Final Office Action," issued in connection with U.S. Appl. No. 14/508,827, dated May 7, 2015, 23 pages.
United States Patent and Trademark Office. "Notice of Allowance," issued in connection with U.S. Appl. No. 14/508,827, dated Oct. 5, 2015, 19 pages.
United States Patent and Trademark Office. "Supplemental Notice of Allowability," issued in connection with U.S. Appl. No. 14/508,827, dated Nov. 2, 2015, 11 pages.
The State Intellectual Property Office of China, "Second Notification of Office Action," issued in connection with Chinese Patent Application No. 201610087478.1, dated Feb. 11, 2018, 7 pages.
China National Intellectual Property Administration, "Notice of Decision of Granting Patent Right for Invention," issued in connection with Chinese Patent Application No. 201610087478.1, dated Apr. 3, 2019, 5 pages.
The State Intellectual Property Office of China, "First Notification of Office Action," issued in connection with Chinese Patent Application No. 201610220524.0, dated Aug. 25, 2017, 14 pages.
State Intellectual Property Office of China, "Notice of Decision of Granting Patent Right for Invention," issued in connection with Chinese Patent Application No. 201410058323.6, dated Feb. 25, 2016, 5 pages.
State Intellectual Property Office of China, "First Notification of Office Action," issued in connection with Chinese Patent Application No. 201610087478.1, dated Jun. 27, 2017, 12 pages.
United States Patent and Trademark Office. "Requirement for Restriction and/or Election," issued in connection with U.S. Appl. No. 15/042,679, dated Sep. 26, 2018, 19 pages.
United States Patent and Trademark Office. "Non-Final Office Action," issued in connection with U.S. Appl. No. 15/042,679, dated Apr. 17, 2019, 14 pages.
United States Patent and Trademark Office. "Notice of Allowance," issued in connection with U.S. Appl. No. 15/042,679, dated Sep. 30, 2019, 14 pages.

\* cited by examiner

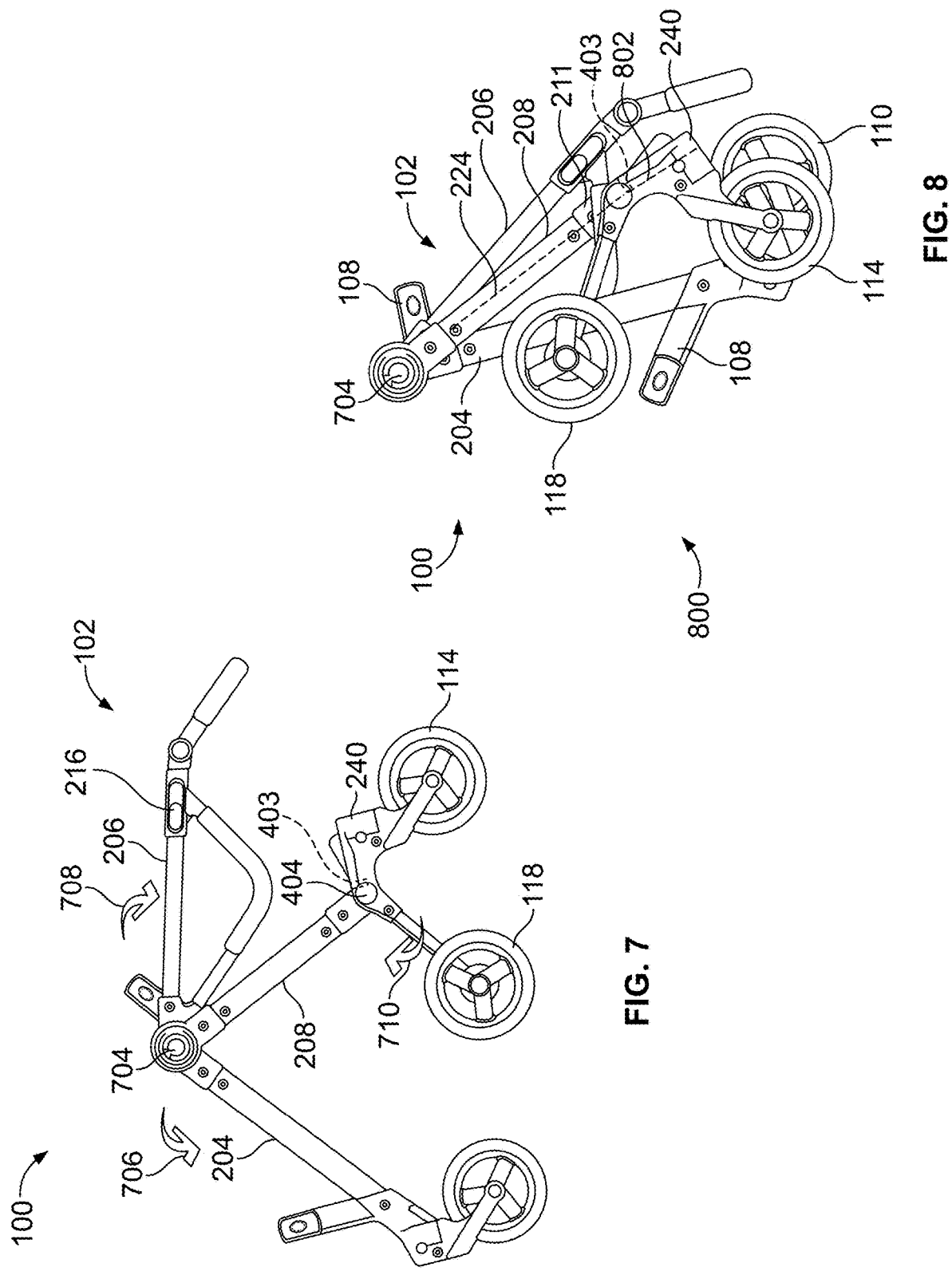

MANEUVERABLE STROLLERS

CROSS REFERENCE TO RELATED APPLICATIONS

This patent arises from a continuation of U.S. patent application Ser. No. 15/042,679, filed on Feb. 12, 2016, entitled "Method for Manufacturing Maneuverable Strollers", now U.S. Pat. No. 10,556,610, which is a continuation of U.S. patent application Ser. No. 14/508,827, filed on Oct. 7, 2014, entitled "Maneuverable Strollers," now U.S. Pat. No. 9,260,127, which is a continuation of U.S. patent application Ser. No. 13/828,344, filed on Mar. 14, 2013, entitled "Maneuverable Strollers," now U.S. Pat. No. 8,882,134, which claims the benefit of U.S. Provisional Patent Application Ser. No. 61/749,728, filed Jan. 7, 2013, entitled "Maneuverable Strollers." U.S. patent application Ser. No. 15/042,679, U.S. patent application Ser. No. 14/508,827, U.S. patent application Ser. No. 13/828,344, and U.S. Provisional Patent Application Ser. No. 61/749,728 are hereby incorporated herein by reference in their entireties.

FIELD OF THE DISCLOSURE

The present disclosure relates generally to child care equipment and, more particularly, to maneuverable strollers.

BACKGROUND OF RELATED ART

Strollers are known in the art. Typically, known strollers include a foldable frame, wheels, and one or more seats to support a child or infant in a seated, prone, and/or lying position. Stroller frames are usually foldable in at least one direction to allow the stroller to collapse to a folded position.

BRIEF DESCRIPTION OF THE DRAWINGS

FIG. 7 is a side view of the example stroller of FIGS. 1-4, 5A, 5B and 6 showing the stroller partially collapsed.

FIG. 8 is a side view of the example stroller of FIGS. 1-4, 5A, 5B, 6 and 7 showing the stroller fully collapsed.

DETAILED DESCRIPTION

Figure 1:
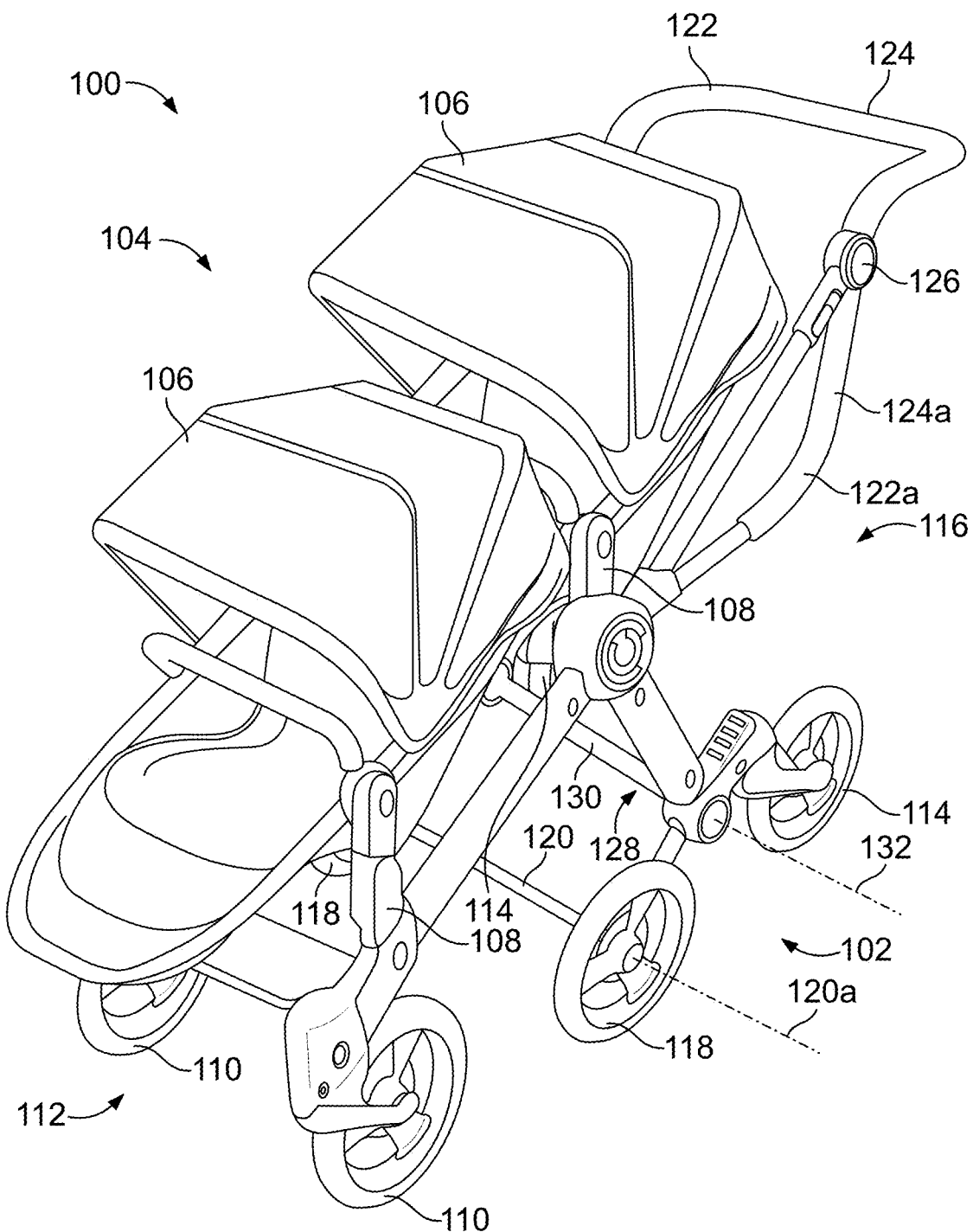
FIG. 1 is a perspective view of an example stroller constructed in accordance with the teachings disclosed herein.

Example strollers disclosed herein improve stability, maneuverability and/or steering control of the stroller, and/or provide improved shock absorption relative to some known strollers. Example strollers disclosed herein enable a user to turn or pivot the example strollers within a tight turning radius. In some examples, the stroller can turn 360 degrees within its own overall length or dimensional envelope. To enable such turning, example strollers disclosed herein employ one or more intermediate, pivot-enabling, and/or enlarged wheels. In some examples an intermediate wheel (e.g., a central wheel) is disposed between one or more front wheels that support a front portion of a stroller frame and one or more rear wheels that support a rear portion of the stroller frame. A distance between the front wheels and the rear wheels substantially defines an overall length of the stroller. In some examples, the intermediate wheel is positioned substantially midway between the front and rear wheels and/or substantially below (e.g., directly below) a center of mass of the occupied stroller. In some examples, to further improve steering and/or maneuverability, the intermediate wheel is positioned closer to a rear wheel than a front wheel such that a distance between a center of the intermediate wheel and a center of the rear wheel is less than a distance between the center of the intermediate wheel and a center of the front wheel. In some examples, positioning the intermediate wheel closer to the rear wheel than to the front wheel facilitates lifting of a front end of the stroller when maneuvering the stroller over an obstacle such as, for example, a curb.

To improve control or maneuverability of the stroller when a front end of the stroller is lifted or elevated relative to a rear end of the stroller (e.g., when a front end of the stroller is lifted, pivoted or tilted to advance past a curb), example strollers disclosed herein employ a pivot or pivot axle. In some examples, the pivot is positioned between the rear wheel and the intermediate wheel. As a result, such example strollers include a frame which pivots relative to the intermediate wheel and the rear wheel when the front end of the stroller is lifted relative to a rear end of the stroller. Some such strollers employ a housing, carriage or carrier to couple the intermediate wheel and a rear wheel to a side frame assembly of the frame. In some examples, the frame is coupled (e.g., pivotally coupled) to the pivot axle via, for example, a bushing. Alternatively, the frames of some example strollers disclosed herein are mounted to the pivot axle and the carriage, of some such example are coupled to the pivot axle via a bushing. The example carriages disclosed herein can cause the intermediate wheel and the rear wheel coupled thereto to pivot relative to the frame about the pivot provided by the pivot axle or axis.

Additionally or alternatively, for the purpose of providing greater stability, facilitate balancing, and/or facilitate lifting of a front end of the stroller, some example strollers disclosed herein employ a suspension apparatus. In some such examples, the suspension apparatus provides a reactive force toward a front end of the frame when the front end of the stroller is pivoted upward or away from a surface about the pivot provided by the pivot axis. As a result, the suspension apparatus reduces (e.g., significantly reduces or prevents) shifting of the stroller's weight toward the rear wheels. In other words, the suspension apparatus maintains a center of mass of the stroller within a perimeter defined by the intermediate wheels and the rear wheels when the front end of the stroller is pivoted about the pivot axis. The suspension apparatus of some such examples provides a reactive force (e.g., an increased force) toward the intermediate wheel and/or the rear wheel when the handle of the example stroller is moved or pivoted about the pivot axle to lift the front end of the stroller. As a result, the suspension apparatus of some such examples helps maintain the rear wheel and the intermediate wheel in engagement with a travel path or ground when the front wheel of the stroller is elevated or lifted relative to the rear wheel and the intermediate wheel. Helping to maintain the intermediate wheel and the rear wheel in engagement with the ground when the front end of the stroller is lifted helps prevent the stroller from tipping about one of the rear wheels.

For the purposes of facilitating or assisting folding of the stroller, some example strollers disclosed herein provide an auxiliary frame member or bar. In some such examples, the frame member is spaced away from a folding pivot of a frame of the stroller to cause the carriage and, thus, the intermediate wheel attached thereto to rotate relative to the frame to a stored position when the example stroller is folded to a collapsed position.

Some example strollers that improve stability, maneuverability and/or steering control of a stroller are disclosed in International Patent Application Serial Number PCT/US2011/062669, which is hereby incorporated herein by reference in its entirety.

FIG. 1 is a perspective view of an example stroller 100 constructed in accordance with the teachings disclosed herein. The example stroller 100 of FIG. 1 includes a frame 102 defining a seating area 104 to accommodate or support one or more child and/or infant seats 106. To support the infant seats 106, the frame 102 of the illustrated example includes one or more infant seats mounts 108. More specifically, the infant seats 106 removably couple to the seat mounts 108 via an interface (e.g., a latch or connector) provided by the seats 106 and the seat mounts 108. To remove the infant seats 106 from the seat mounts 108, a connector defined by the interface is released via a release (e.g., a spring-loaded push button). Additionally or alternatively, the seat mounts 108 may be adjusted along the frame 102 to adjust a position of the infant seats 106 relative to the frame 102 and/or each other.

The frame 102 of the illustrated example is supported by one or more front wheels 110 at a front end 112 of the frame 102 and one or more rear wheels 114 at a rear end 116 of the frame 102. The frame 102 of the illustrated example is assembled to form a structure which is intended to stay assembled in all phases of its use and storage. Additionally, for the purposes of improving maneuverability, control steering and/or to provide shock absorption, the frame 102 of the illustrated example employs one or more intermediate wheels 118 disposed between the front and rear wheels 110, 114. To provide shock absorption to the example stroller 100, the intermediate wheels 118, the front wheels 110 and/or the rear wheels 114 of the illustrated example may be implemented by air inflatable wheels composed of rubber. As shown in the illustrated example, a diameter of the intermediate wheels 118 is substantially similar or identical to a diameter of the front wheels 110 and the rear wheels 114.

In the illustrated example of FIG. 1, the intermediate wheels 118 are positioned closer to the rear wheels 114 than to the front wheels 110. However, in other examples, the intermediate wheels 118 may be disposed at approximately a midpoint between the front and rear wheels 110, 114. Each intermediate wheel 118 of the illustrated example defines a pivot (e.g., a turning pivot point) providing structure disposed or positioned between the front and rear wheels 110, 114. Thus, in the illustrated example, each of the intermediate wheels 118 provides a pivot point for the stroller 100 that is offset or laterally spaced from the rear end 116 of the stroller 100 and/or the rear wheels 114. Consequently, both the front end 112 of the stroller 100 and the rear end 116 of the stroller 100 are able to pivot or rotate in an arcuate path about the turning pivot or point provided by one of the respective intermediate wheels 118 when a user turns the stroller 100 of the illustrated example (e.g., by applying a sideways force to the stroller 100) in a rightward direction, a leftward direction, and/or a 360 degree turn or circle while having all wheels 110, 114 and 118 in engagement with the ground or travel surface.

As shown in the illustrated example, the intermediate wheels 118 are coupled to one another via an axle 120 and rotate about a common axis of rotation 120a. However, in other examples, the axle 120 may be removed to enable the intermediate wheels 118 to drive or rotate independently relative to each other. In addition, although the example stroller 100 includes two intermediate wheels 118, other example strollers may employ only one intermediate wheel 118 or more than two intermediate wheels 118. For example, the stroller 100 may include a third intermediate wheel disposed on the axle 120 between the first and second intermediate wheels 118.

Because the intermediate wheels 118 are located substantially beneath (e.g., vertically aligned with) the seating area 104 of the stroller 100, the intermediate wheels 118 absorb a substantial portion of a load provided by a child sitting in the infant seats 106 of the stroller 100 of the illustrated example. In other words, in the illustrated example, a load or weight of a child sitting in the seating area 104 is largely carried by the intermediate wheels 118 when a user turns the stroller 100 of the illustrated example. As a result, a load provided by the child rotates about a pivot point provided by one of the intermediate wheels 118. In this manner, the combined load or weight of the stroller 100 and a child in the stroller 100 requires less force (or torque) to turn or pivot the stroller 100 then would be required by a stroller and a child of similar combined weight without the intermediate wheels 118. Because the weight (or the center of mass) of a child in the stroller 100 of the illustrated example is close to the pivot axis or pivot point of the intermediate wheel 118, the force or torque required to pivot or turn the stroller 100 of the illustrated example when a child is seated in the seating area 104 is relatively low. As a result, the stroller 100 of the illustrated example can turn about a pivot point provided by either of the intermediate wheels 118 with a relatively tight turning radius and with relative ease. For example, the example stroller 100 of FIG. 1 can turn 360 degrees within its own length.

To enable a user to push, turn and/or tilt the stroller 100 of the illustrated example, the frame 102 includes a handle 122 having a grip 124 which a user may take hold of to move, control and/or steer the stroller 100. Further, the handle 122 of the illustrated example is adjacent the rear wheels 114. The stroller 100 of the illustrated example includes an auxiliary handle 122a having an auxiliary grip 124a to enable a child or person to take hold of the auxiliary grip 124a for support when walking along the stroller 100. The auxiliary handle 122a typically is not used to maneuver the stroller 100, but it could serve that purpose for some uses. The handle 122 is coupled to the frame 102 via a handle articulation hub or joint 126, which enables adjustment of the handle 122 relative to the frame 102.

As described in greater detail below, to further improve stability and/or facilitate balancing when maneuvering the stroller 100 over a curb or other obstacle, the example stroller 100 of the illustrated example employs a suspension apparatus 128. More specifically, the example suspension apparatus 128 of FIG. 1 provides stability and/or facilitates balancing when the front end 112 of the stroller 100 is pivoted or tilted relative to the rear end 116 of the frame 102 via the handle 122 (e.g., the front end 112 is lifted in an upward direction relative to a support surface (e.g., the ground)). Additionally, as discussed in greater detail below in connection with FIGS. 2, 3 and 4, the example stroller 100 employs an axle 130 to enable the frame 102 to pivot about an axis 132 of the axle 130 when the front end 112 is elevated, tilted or raised from a travel surface relative to the rear wheels 114 and the intermediate wheels 118.

Figure 2:
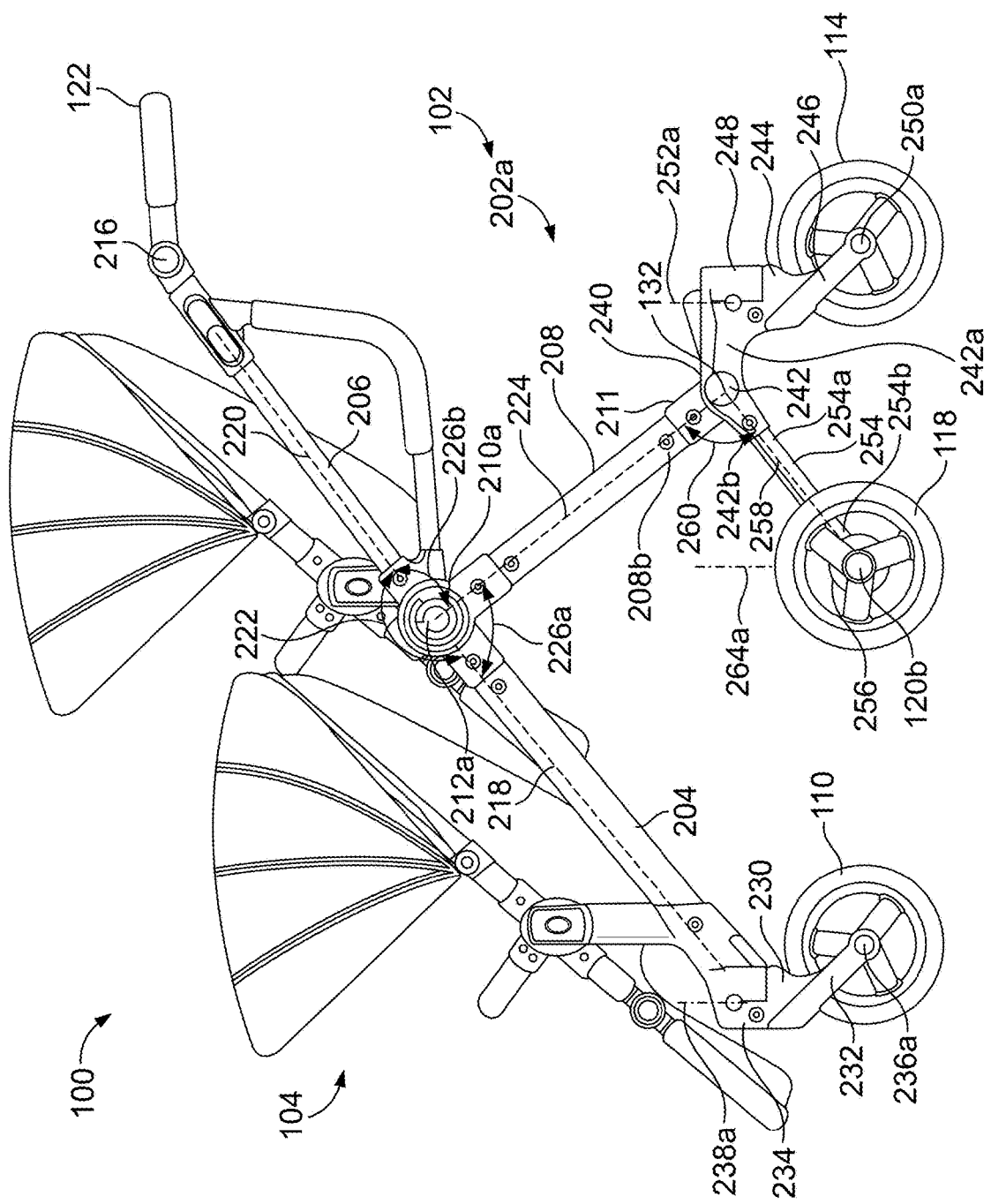
FIG. 2 is a left side view of the example stroller of FIG. 1.
Figure 3:
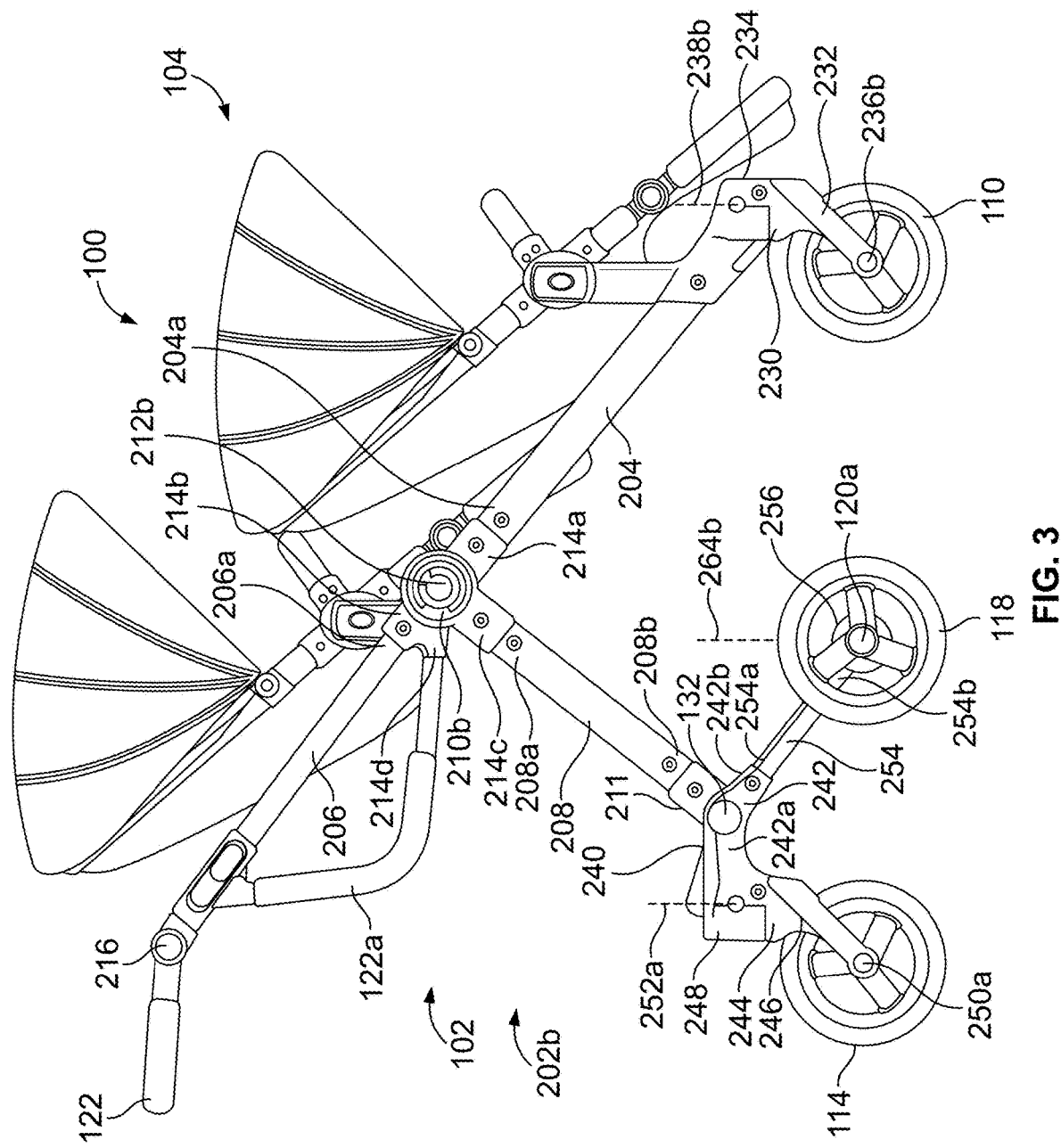
FIG. 3 is a right side view of the example stroller of FIGS. 1 and 2.

FIG. 2 illustrates a first or left side view of the stroller 100. FIG. 3 illustrates a second or right side view of the example stroller 100 of FIG. 1. Referring to FIGS. 2 and 3, the frame 102 of the illustrated example includes a first side frame assembly 202a laterally spaced from a second side frame assembly 202b to define the seating area 104. The first and second side frame assemblies 202a, 202b of the illustrated example are substantially similar or identical and are symmetrical. The handle 122 of the illustrated example extends between the side frame assemblies 202a, 202b and may be formed from a single tube that is bent into a generally U-shaped structure.

Referring to FIGS. 2 and 3, each of the side frame assemblies 202a, 202b of the illustrated example includes a lower frame support 204, an upper frame support 206, and an intermediate frame support 208. In the illustrated example, the frame supports 204, 206 and 208 have a substantially linear profile (e.g., a straight and/or flat profile). However, in other examples, the frame supports 204, 206 and 208 may be any shape, including a generally curved shape or a shape having one or more curved and/or linear portions.

For the purpose of enabling the stroller 100 of the illustrated example to fold or collapse in at least one direction, the frame supports 204, 206 and 208 of the first side frame assembly 202a are pivotally coupled via a first pivot connector or pivot joint 210a. More specifically, the connector or pivot joint 210a is defined by a hub 212a (e.g., a T-shaped hub) to receive a respective end of each of the frame supports 204, 206 and 208 of the first side frame assembly 202a. The hub 212a of the illustrated example enables the frame supports 204, 206 and 208 to pivot relative to each other to, for example, collapse the stroller 100 as discussed in greater detail below. Similarly, the frame supports 204, 206 and 208 of the second side frame assembly 202b are pivotally coupled at a second pivot connector or pivot joint 210b. More specifically, the connector or pivot joint 210b is defined by a hub 212b (e.g., a T-shaped hub) to receive a respective end of each of the frame supports 204, 206 and 208 of the second side frame assembly 202b. Like the hub 212a, the hub 212b enables the frame supports 204, 206 and 208 of the second side frame assembly 202b to pivot relative to each other.

Referring to FIG. 3, each of the hubs 212a, 212b of the illustrated example includes a first leg or opening 214a to receive or couple to a first end 204a of the lower frame support 204, a second leg or opening 214b to receive or couple to a first end 206a of the upper frame support 206, and a third leg or opening 214c to receive or couple to a first end 208a of the intermediate frame support 208. In this example, the hubs 212a, 212b also include a fourth leg or opening 214d to receive an end of the auxiliary handle 122a. The legs 214a-c enable the frame supports 204, 206 and 208 to pivot relative to each other about the respective pivot connectors 210a, 210b when a locking mechanism (e.g., a latch) of the hubs 212a, 212b is in a released or unlocked condition. When the locking mechanism of the hubs 212a, 212b is in a locked condition, the frame supports 204, 206 and 208 cannot rotate or pivot relative to each other about the respective pivot connectors 210a, 210b. The locking mechanism of the hubs 212a, 212b may be moved to an unlocked condition via a release actuator 216 positioned on the upper frame support that may be activated by a user.

Referring to FIG. 2, when the frame 102 is erected, the lower frame support 204 and the upper frame support 206 of the first side frame assembly 202a are substantially aligned or parallel relative to each other such that an axis 218 of the lower frame support 204 is substantially aligned with an axis 220 of the upper frame support 206. However, in other examples, the lower frame support 204 may be positioned at any angle relative to the upper frame support 206 when the frame 102 is in the erected state. For example, an angle 222 between the axis 218 of the lower frame support 204 and the axis 220 of the upper frame support 206 may be between approximately 100 degrees and 200 degrees.

The intermediate support frame 208 of the illustrated example projects from the respective hubs 212a and 212b toward the rear wheels 114. To enable the frame 102 to pivot relative to the intermediate wheels 118 and/or the rear wheels 114, the intermediate frame support 208 is pivotally coupled to the axle 130 (FIG. 1). More specifically, in the illustrated example, a second end 208b of the intermediate frame support 208 is coupled to the axle 130 (FIG. 1) via a connecter or bushing 211. The busing 211 of the illustrated example, which includes a portion coaxially coupled to the axle 130, enables the intermediate frame support 208 and, thus, the lower and upper frame supports 204, 206 to pivot about the axis 132 of the axle 130.

When coupled to the respective pivot joint 110a and the axle 130, the intermediate frame support 208 of the illustrated example is substantially perpendicular to the lower frame support 204 and the upper frame support 206. In other words, an axis 224 defined by the intermediate frame support 208 is at a substantial ninety degree angle relative to the axis 218 of the lower frame support 204 and the axis 220 of the upper frame support. However, in other examples, the intermediate frame support 208 may be at any different angle relative to the lower frame support 204 and/or the upper frame support 206. For example, an angle 226a between the axis 224 of the intermediate frame support 208 and the axis 218 of the lower frame support 204 and/or an angle 226b between the axis 224 of the intermediate frame support 208 and the axis 220 of the upper frame support 206 may be may be any other suitable angle that is less than ninety degrees or greater than ninety degrees.

Referring to FIGS. 2 and 3, to mount or attach the front wheels 110 of the illustrated example to respective ones of the side frame assemblies 202a, 202b, each of the front wheels 110 of the illustrated example includes a front wheel housing 230. For example, the front wheel housing 230 may be coupled or attached to an end of the lower frame support 204. Each front wheel housing 230 of the illustrated example includes a fork or wheel support 232 rotatably mounted to a connector 234. Each front wheel 110 is rotatably journalled to the wheel support 232 to enable each of the front wheels 110 to rotate independently about a separate axis of rotation 236a, 236b (e.g., a substantially horizontal axis relative to a level ground surface on which the stroller 100 is positioned). Additionally, to improve steering, each of the front wheels 110 of the illustrated example is able to rotate, swivel or pivot about a corresponding substantially vertical axis 238a, 238b that is substantially perpendicular to the corresponding axis of rotation 236a, 236b. In the illustrated example, the front wheels 110 are able to pivot about the corresponding vertical axis 238a, 238b due to a pivot connector between the corresponding wheel support 232 and the corresponding connector 234.

To mount or attach the rear wheels 114 and the intermediate wheels 118 to the respective side frame assemblies 202a, 202b, each of the side assemblies 202a, 202b of the illustrated example employs a housing or carriage 240 (e.g., a boogie). The carriage 240 of the illustrated example is a unitary body or structure. More specifically, the carriage 240 of the illustrated example includes or defines a hub 242 that attaches or couples the rear wheels 114 and the intermediate wheels 118 to the frame 102. In the illustrated example, the axle 130 is journalled on the carriage 240. The example carriage 240 can pivot relative to the frame 102 and/or the intermediate frame support 208. Each hub 242 of the illustrated example includes a first portion or leg 242a to receive or couple to a respective one of the rear wheels 114 and a second portion or leg 242b to receive or couple to a respective one of the intermediate wheel 118.

For example, the first portion 242a of the example carriage 240 receives a rear wheel housing 244 having a fork or rear wheel support 246 rotatably mounted to a connector 248 that is mounted (e.g., via a screw) or integrally formed with the carriage 240. Each rear wheel 114 is rotatably mounted to the rear wheel support 246 to enable each of the rear wheels 114 to rotate independently about a separate axis of rotation 250a, 250b (e.g., each of which is a substantially horizontal axis relative to a level ground surface on which the stroller is positioned). Additionally, to improve steering, each of the rear wheels 114 of the illustrated example is able to rotate, swivel or pivot about a substantially vertical axis 252a, 252b substantially perpendicular to the respective axis of rotation 250a, 250b. In the illustrated example, the rear wheels 114 are able to pivot about the respective vertical axis 252a, 252b because of a pivot connector between the corresponding wheel support 246 and/or carriage 240 and the corresponding connector 248.

In the illustrated example, each intermediate wheel 118 is coupled to the respective carriage 240 via an arm or frame member 254. In the illustrated example, a first end 254a of the arm 254 is coupled or fixed to the second portion 242b of the carriage 240 and a second end 254b of the arm 254 defines or is coupled to a hub 256 of the intermediate wheel 118. The arm 254, when coupled to the carriage 240, projects from the carriage 240 in a direction away from the rear wheels 114 and toward the front wheels 110 to position the intermediate wheels 118 between the rear wheels 114 and the front wheels 110. As shown in the illustrated example, the arms 254 position the intermediate wheels 118 closer to the rear wheels 114 than to the front wheels 110. However, in other examples, the arm 254 may be configured to position the intermediate wheels 118 at approximately a midpoint between the axis of rotation 236a, 236b of the front wheels 110 and the axis of rotation 250a, 250b of the rear wheels 114. A central axis 258 (FIG. 2) of the arm 254 of the illustrated example is at an angle 260 (e.g., substantially perpendicular) relative to the central axis 224 of the intermediate frame support 208. As described in greater detail below, the angle 260 varies when the intermediate frame support 208 and/or the frame 102 pivots relative to the carriage 240 about the axis 132 defined by the axle 130.

As noted above, the intermediate wheels 118 of the illustrated example are mounted on the axle 120 (FIG. 1) extending between the side frame assemblies 202a, 202b. Thus, the axle 120 rotatably couples the intermediate wheels 118. As a result, the intermediate wheels 118 of the illustrated example rotate about the axis of rotation 120a of the axle 120. However, while the intermediate wheels 118 of the illustrated example are able to rotate about the axis of rotation 120a, the intermediate wheels 118 are fixed against swiveling or pivoting in other directions (e.g., unlike the front and rear wheels 110, 114, the intermediate wheels 118 cannot rotate about a substantially vertical axis 264a, 264b substantially perpendicular to the respective axis of rotation 120a). As a result, the intermediate wheels 118 of the example stroller 100 of FIG. 1 provide resistance to lateral drifting of the stroller 100 when the stroller 100 is moving or being pushed in a substantially straight path. However, in other examples, the intermediate wheels 118 can swivel about the vertical axis 264a, 264b relative to the frame 102.

As noted above, the intermediate wheels 118 of the illustrated example define pivots or points around which the stroller 100 of the illustrated example may be turned. In other words, each intermediate wheel 118 of the illustrated example defines a pivot point disposed between the front and rear wheels 110, 114. For example, when applying sufficient force to the handle 122 of the stroller 100 of the illustrated example in a leftward direction relative to the orientation of a user standing behind the stroller and gripping the handle 122 (e.g., a clockwise direction looking down from above the stroller 100), the stroller 100 pivots about the (right side) intermediate wheel 118 of the second side frame assembly 204b such that the front wheels 110 move along an arcuate path in a direction toward the second side frame assembly 202b and the rear wheels 114 move along an arcuate path in a direction toward the first side frame assembly 202a. Likewise, when a user applies a force to the handle 122 of the stroller 100 in a rightward direction relative to the orientation of a user gripping the handle 122 (e.g., a counterclockwise direction looking from above the stroller 100), the stroller 100 of the illustrated example pivots about the (left side) intermediate wheel 118 of the first side frame assembly 202a such that the front wheels 110 move along an arcuate path in a direction toward the first side frame 202a and the rear wheels 114 move along an arcuate path in a direction toward the second side frame assembly 202b. In some examples, the stroller can turn 360 degrees within its own overall length or dimensional envelope.

Figure 4:
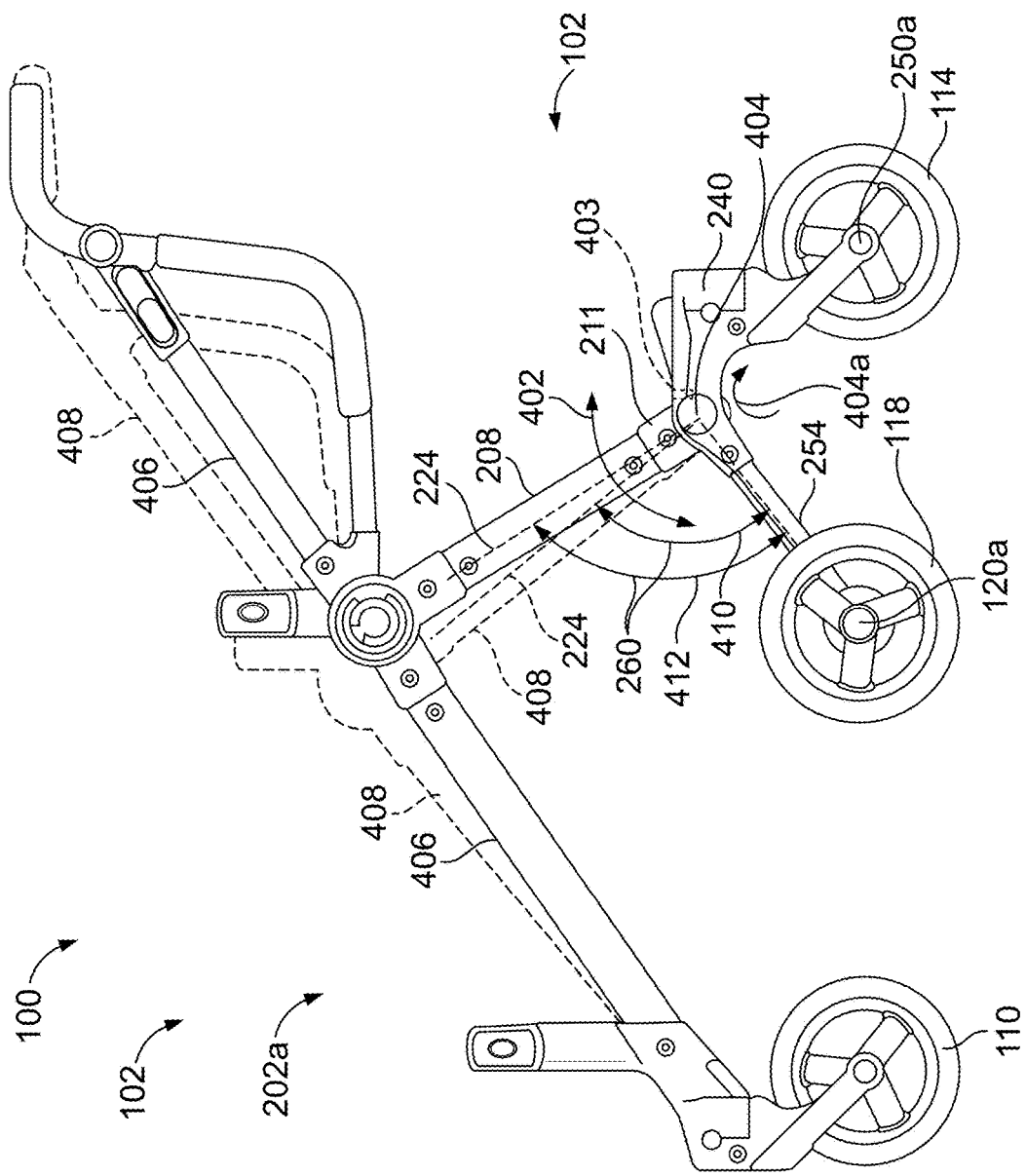
FIG. 4 is a side view of the example stroller of FIGS. 1-3 showing an example range of pivotal motion of the example stroller when all wheels of the example stroller are in engagement with a substantially even or level travel path.

FIG. 4 is a side view of the example stroller 100 of FIGS. 1-3. In the illustrated example of FIG. 4, the carriage 240 of the first side frame assembly 202a is coupled or mounted to the frame 102 via a first end of the axle 130 (FIG. 1). The carriage 240 of the second side frame assembly 202b is substantially identical to the carriage 240 of the first side frame assembly 202a and is mounted to a second end of the axle 130 in the same manner as the carriage 240 of the first side frame assembly 202a. Thus, the following description will focus on one carriage to serve as the description for both carriages 240. The carriage 240 and, thus, the intermediate wheels 118 and the rear wheels 114 that are attached thereto can pivot about the axis 132 defined by the axle 130 relative to the intermediate frame support 208 (e.g., via a bushing). As a result, the intermediate frame support 208 and/or the carriages 240 of the respective left and right side frame assemblies 202a and 202b can pivot relative to each other about a pivot 404 defined by the axle 130 and/or the axis 132 (FIG. 1). For example, the intermediate frame support 208, the frame 102 and/or the carriages 240 can pivot in a rotational direction 402 about a pivot point 404 defined by the axis 132 (e.g., a clockwise and counterclockwise rotation about the axis 132). Although the carriage 240 of the first side frame assembly 202a can pivot relative to the carriage 240 of the second side frame assembly 202b about the axis 132 defined by the axle 130, the axle 120 (FIG. 1) extending between the intermediate wheels 118 connects or couples the respective intermediate wheels 118 of each carriage 240. As a result, the carriage 240 of the first side frame assembly 202a and the carriage 240 of the second side assembly 202b of the illustrated example rotate or pivot together about the axis 132. However, in examples in which the axle 120 is not used, the carriage 240 of the first side frame assembly 202a can rotate or pivot independently about the axis 132 relative to the carriage 240 of the second side frame assembly 202b and/or the intermediate frame support 208.

The pivot point 404 of the illustrated example is positioned between the intermediate wheels 118 and the rear wheels 114. In particular, the pivot point 404 is positioned between the axis of rotation 120a of the intermediate wheels 118 and the axis of rotation 250a, 250b of the rear wheels 114. Also, in this example, the pivot 404 is offset relative to (e.g., positioned at least above) the axes of rotation 120a and 250a, 250b. As a result, the intermediate wheels 118 and the rear wheels 114 can pivot relative to the frame 102 to move and/or follow a contoured travel surface. Thus, some contour variations in a travel surface that may cause the front end 112 to lift or elevate (or, alternatively, lower) relative to the rear end 116 will not cause the intermediate wheels 118 and/or the rear wheels 114 to disengage or lift-off the travel surface. For example, the stroller 100 of the illustrated example of FIG. 4 is shown being moved or shifted to a first position 406 from an initial position 408 illustrated via a shadow line. In other words, the angle 260 between the axis 258 of the arm 254 and the intermediate frame support 208 varies between a first angle 410 when the frame 102 is in the initial position 408 and a second angle 412 when the frame 102 is in the first position 406 as the frame 102 pivots or tilts about the pivot 404.

To limit the angle 260 that the intermediate frame support 208 can pivot relative to the carriage 240 (e.g., the angle between the intermediate frame support 208 and the arm 254), the stroller 100 of the illustrated example employs one or more travel limits. In the illustrated example, the travel limits are physical obstructions (e.g., stops) that are engaged by the intermediate frame support 208 and/or the arm 254 to block further rotational movement in a respective direction. The stroller 100 of the illustrated example employs a travel limit 403 positioned on the axle 130 to limit the angle 260 that the intermediate frame support 208 can pivot relative to the carriage 240 or the arm 254 in a first rotational direction 404a (e.g., a clockwise direction). For example, the angle 260 between the axis 224 of the intermediate frame support 208 and the arm 254 may be limited to approximately between 0 and 120 degrees. In other examples, the travel limit 403 may be positioned on the carriage 240 and/or the intermediate frame support 208. In some examples, two travel limits may be employed to limit the angle 260 that the intermediate frame support 208 can pivot relative to the carriage 240 or the arm 254. Other locations, members and/or configurations of the travel limits are employed in other examples.

Figure 5:
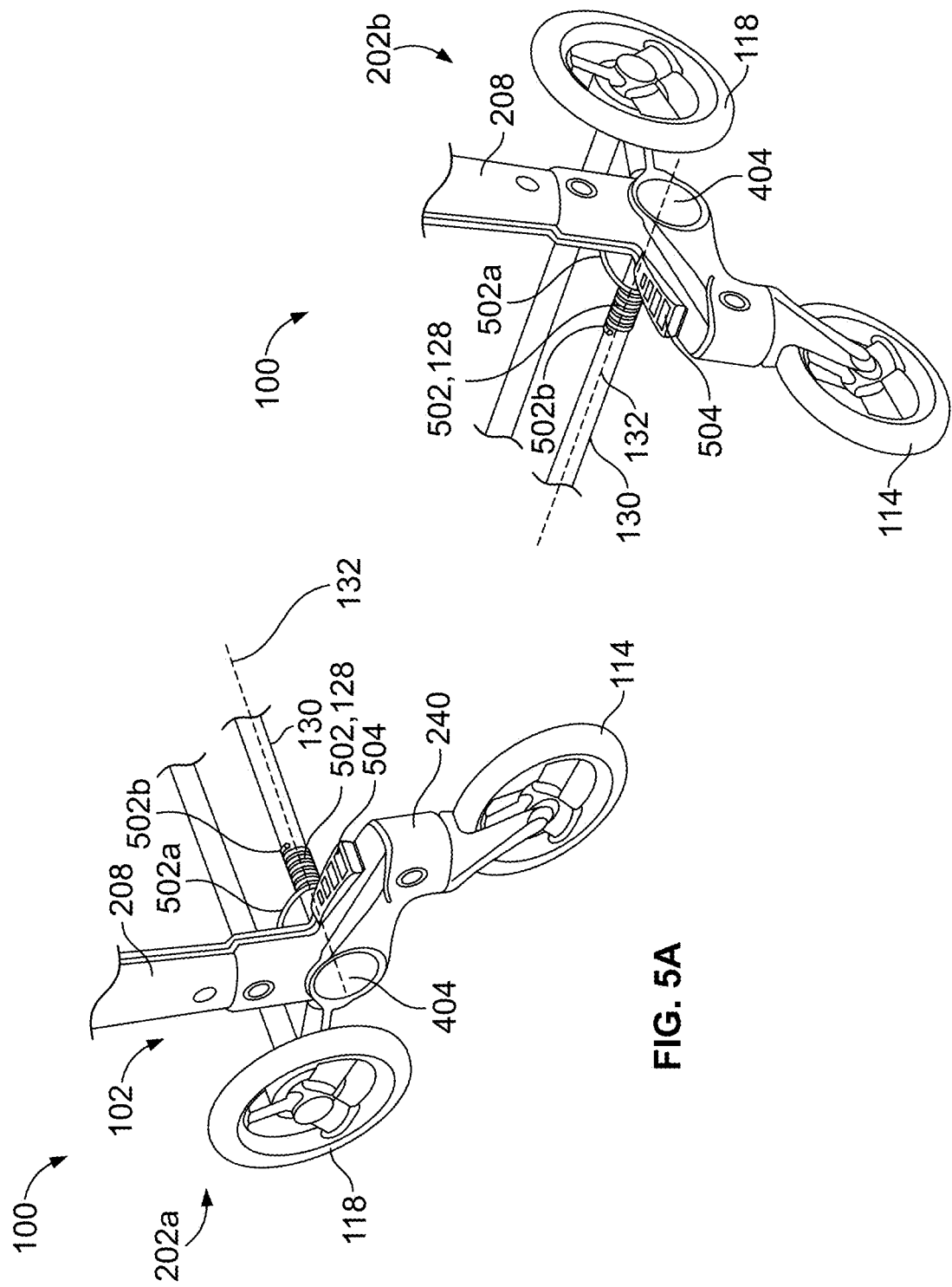
FIG. 5A is a partial perspective left side view of the example stroller of FIGS. 1-4.
FIG. 5B is a partial perspective right side view of the example stroller of FIGS. 1-4.

FIGS. 5A and 5B illustrate partial, rear perspective views of the respective side frame assemblies 202a, 202b. Referring to FIGS. 5A and 5B, to further help support the frame 102 when the frame 102 is pivoted about the pivot 404, the stroller 100 of the illustrated example employs the suspension apparatus 128. The example suspension apparatus 128 of the illustrated example is a torsion spring 502 coupled to the axle 130, the intermediate frame support 208 and/or the busing 211. For example, the first side frame assembly 202a of FIG. 5A includes a first torsion spring 502 and the second side frame assembly 202b of FIG. 5B has a second torsion spring 502. Each of the torsion springs 502 has a first portion 502a coupled or engaged by the intermediate frame support 208 and a second portion 502b coupled or fixed to the axle 130. As a result, rotation of the intermediate frame 208 about the axis 132 in the direction 402a causes the first portion 502a of each torsion spring 502 to move relative to the second portion 502b of the torsion spring 502, thereby increasing a tension or a force provided by each torsion spring 502. In other examples, the torsion spring 502 is a unitary spring that extends along the length of the axle 130 having respective ends coupled to the first and second side frame assemblies 202a, 202b (e.g., the intermediate frame supports 208, the carriages 240, etc.). In other examples, the suspension apparatus 128 may be a leaf spring and/or a torsion bar coupled to the axle 130, a fluid cylinder positioned between the upper frame support 206 and the carriage 240, and/or any other suspension apparatus that provides a reactive force or an increased force when the handle 122 of the stroller 100 is moved or pivoted toward the rear wheels 114 about the pivot 404.

The example carriage 240 of the illustrated example also supports a portion of the brake apparatus. The brake apparatus of the example stroller 100 is selectively movable between a locked position to prevent or restrict rotation of the respective intermediate and rear wheels 118 and/or 114 and an unlocked position to enable rotation of the intermediate and rear wheels 118 and/or 114. To move the brake apparatus between the locked and unlocked positions, the stroller 100 of the illustrated example employs a brake lever or foot pedal 504 supported by the carriage 240. The brake lever 504 of the illustrated example is depressible relative to the carriage 240 to frictionally engage or impede rotation of the respective rear wheels 114 about their axis of rotation 250a, 250b.

Figure 6:
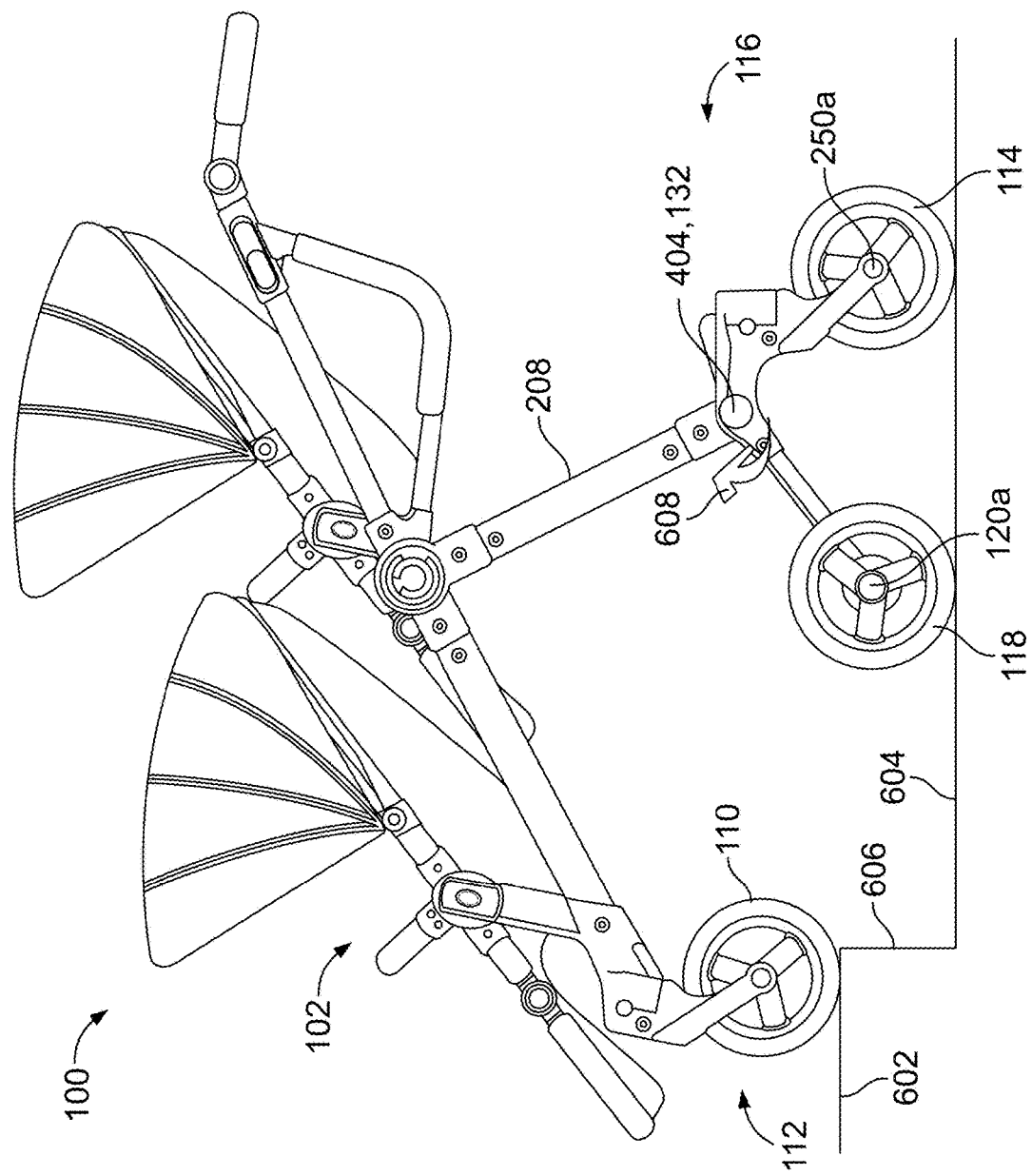
FIG. 6 is a side view of the example stroller of FIGS. 1-4, 5A and 5B showing a front wheel of the example stroller elevated relative to a rear wheel and an intermediate wheel of the example stroller.

FIG. 6 is a side view of the example stroller 100 of FIGS. 1-4, 5A and 5B having the front end 112 of the frame 102 lifted or tilted upward relative to the rear end 116 of the frame 102. More specifically, the front wheels 110 in the illustrated example of FIG. 6 are positioned on an elevated surface 602 relative to a surface 604 on which the intermediate wheels 118 and the rear wheels 114 are positioned. In the illustrated example, the elevated surface 602 may be a top surface of a curb 606 or step. Further, as noted above in connection with FIG. 4, the travel limit 403 employed to limit the rotational distance the intermediate frame support 208 may pivot about the axle 130 (e.g., a five degree rotation) is sufficient to enable the front end 112 of the stroller 100 to overcome (e.g., reach the top of) the curb 606 (e.g., a height of 5 inches) while the intermediate and rear wheels 118, 114 remain on the lower surface 604.

When the front end 112 of the frame 102 is pivoted upward about the pivot 404 (e.g., in a clockwise direction about the pivot 404), the suspension apparatus 128 provides a reactive torque or force (e.g., an increased force) toward the front end 112 to enhance stability. To enhance stability, the suspension apparatus 128 generally dampens or distributes a downward force applied to the handle 122 between the side frame assemblies 202a, 202b and supports a weight of the stroller 100 that may otherwise shift toward the rear end 116 of the frame 102 (e.g., away from the intermediate wheels 118) when the intermediate frame support 208 moves about the pivot 404 in a direction 608 when the front end 112 of the stroller 100 is lifted, pivoted or tilted (e.g., to advance past the curb or step 606). For example, the reactive force or torque provided by the suspension apparatus 128 resists (e.g., significantly reduces or prevents) a shift of the center of mass of the stroller 100 (e.g., the weight of the stroller and/or a child in the seating area 104) away from the intermediate wheels 118 and toward the rear wheels 114 when the front end 112 of the frame 102 is pivoted or tilted about the pivot 404. In other words, the reactive force maintains or positions the center of mass of the stroller 100 substantially aligned and/or adjacent the intermediate wheels 118. To facilitate control of the stroller 100 when the front end 112 of the stroller 100 is tilted upward relative to the rear end 116 of the frame 102, the suspension apparatus 128 helps maintain or position the center of mass of the stroller 100 between the axis of rotation 250a, 250b of the rear wheels 114 and the axis of rotation 120a of the intermediate wheels 118.

As a result, in addition to a load provided by a child in the seating area 104 (FIG. 1), the suspension apparatus 128 provides an effective downward biasing force to the intermediate wheels 118 and/or the rear wheels 114. In this manner, the suspension apparatus 128 facilitates balancing and/or improves stability of the stroller 100 by helping to maintain the intermediate wheels 118 and/or the rear wheels 114 in engagement and/or in contact with a travel path or the surface 604 (e.g., the ground) when the front wheels 110 are elevated or lifted off of the surface 604 relative to the rear wheels 114 and the intermediate wheels 118. Maintaining the intermediate wheels 118 and the rear wheels 114 in engagement with the surface 604 when the front end 112 of the stroller 100 is lifted helps prevent the stroller 100 from tipping about one of the rear wheels 114 (e.g., torqueing to the side). Absent the suspension apparatus 128, a user would need to apply a greater force to balance the stroller 100 and maintain the intermediate wheels 118 and the rear wheels 114 in contact with the ground when the front end 112 of the stroller 100 is lifted (e.g., in an upward direction) relative to the rear end 116.

The intermediate wheels 118 of the illustrated example do not substantially increase the overall dimensional envelope of the stroller 100. In particular, the intermediate wheels 118 do not significantly affect the ability of the stroller 100 of the illustrated example to collapse with a compact profile. FIGS. 7 and 8 illustrate the example stroller 100 of FIG. 1 being folded from an in-use unfolded position shown in FIGS. 1-6 to a collapsed, folded, or storage position 800 shown in FIG. 8. As noted above, the side frame assemblies 202a, 202b are constructed such that the entire stroller 100 of the illustrated example is selectively moveable between an extended, unfolded, in-use position (FIGS. 1-6) and a collapsed, folded, or storage position 800 (FIG. 8). The stroller 100 of the illustrated example has a low profile or compact dimensional envelope when the stroller 100 is in the collapsed position 800. The intermediate wheels 118 of the illustrated example do not significantly increase the overall dimensional envelope of the stroller 100 of the illustrated example when the stroller 100 is in the unfolded position (FIGS. 1-6) and/or the folded position 800 (FIG. 8). Further, the intermediate wheels 118 do not interfere with folding the stroller 100 to the folded position 800.

To maintain the stroller 100 in the use or unfolded position, each of the hubs 212a, 212b of the stroller 100 of the illustrated example include a latch mechanism. The latch mechanism of the illustrated example includes a latch plate secured by a detent, a lock, spring, and/or any other mechanism to lock and maintain the frame 102 of the illustrated example in the in-use position. Any known latch may be used in this role. The latch mechanism employed is immaterial to this disclosure. The latch mechanism maintains the hubs 212a, 212b and, thus, the frame supports 204, 206 and 208 in a locked condition to prevent rotation of the frame supports 204, 206 and 208 relative to each other (to thereby prevent the stroller 100 from collapsing). To collapse the stroller 100 of the illustrated example, the release 216 is activated (e.g., slid and/or depressed) to unlock the latch mechanism and enable the respective portions 214a-c of the hubs 212a, 212b to rotate relative to each other. More specifically, in the unlocked condition, the frame supports 204, 206 and/or 208 are freed to rotate or pivot relative to each other about a pivot 704 provided by the pivot connectors 210a, 210b. In the illustrated example, the lower and upper frame supports 204, 206 of the illustrated example pivot toward the intermediate frame support 208 in the direction shown by the respective arrows 706 and 708 into the configuration illustrated in FIGS. 7 and 8. Further, the carriage 240 of the illustrated example also rotates toward the intermediate frame support 208 in a direction represented by arrow 710 when folding the stroller 100 to the folded position 800. Rotation of the carriage 240 in the direction arrow 710 is not hindered by the travel limit 403 discussed above. Instead, as noted above, the travel limit 403 restricts rotation of the carriage 240 in the direction 403a, which is opposite direction of arrow 710.

As shown in FIG. 8, in the fully collapsed, folded or storage position 800, the stroller 100 of the illustrated example has a relatively low profile or dimensional envelope and a relatively small profile. In the folded position 800, an axis 802 of the rear wheel housing 244 is substantially aligned (e.g., slightly offset) relative to the axis 224 of the intermediate frame support 208. While a collapsible frame 102 is shown, in some examples the stroller does not collapse.

Figure 9A:
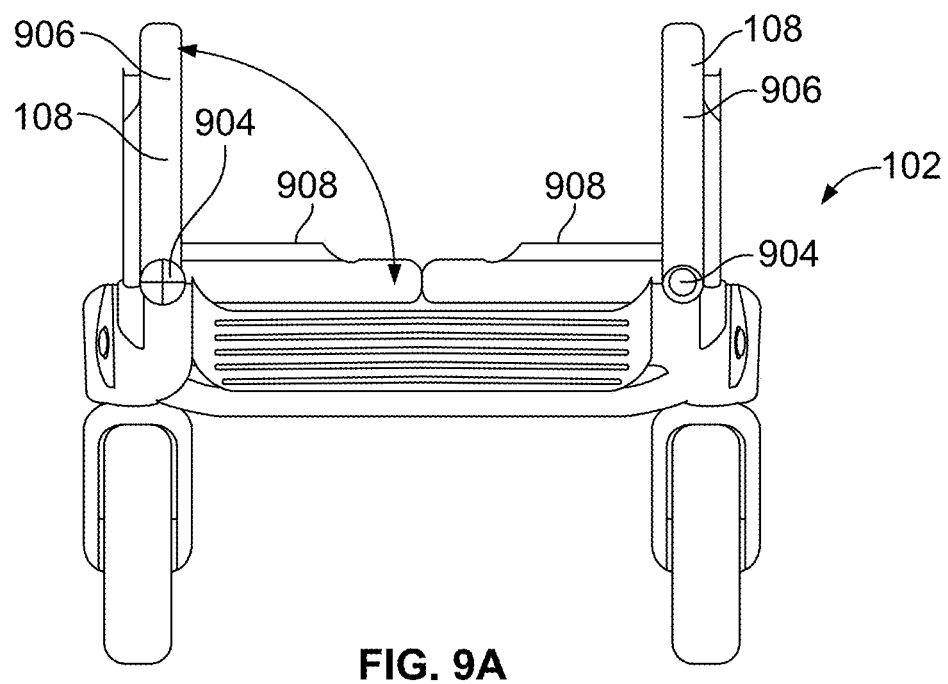
FIGS. 9A and 9B illustrate an example seat mount disclosed herein.
Figure 9B:
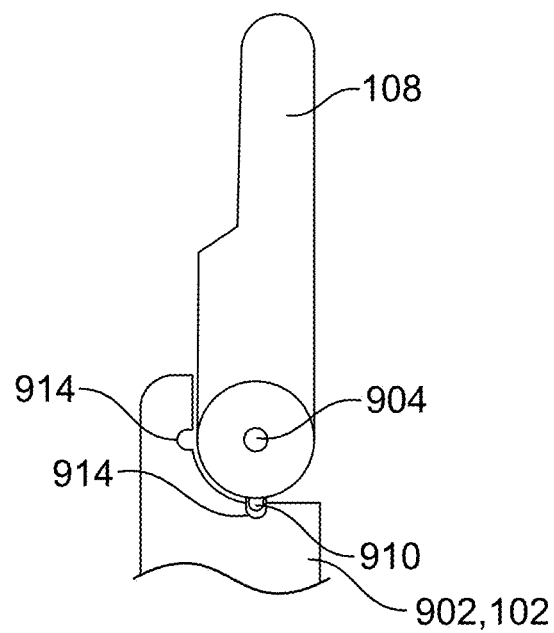

In some examples, the seat mounts 108 may be folded relative to the frame 102 prior to or after the stroller 100 is in the folded position 800. For example, FIGS. 9A and 9B illustrate example seat mounts 108 that fold relative to the frame 102. The seat mounts 108 of the illustrated example are pivotally coupled or attached to a connector or housing 902 and/or the frame 202 of the stroller 1000. Each of the seat mounts 108 of the illustrated example pivots relative to the connector 902 or frame 202 about a pivot point 904 between a first upright or in use position 906 and a second or lowered folded position 908. In the illustrated example of FIG. 9B, in the first position 906, a latch 910 (e.g., a protruding member or tab) of the seat mount 108 engages an opening or recess 912 in the frame 202 to lock or restrict rotation of the seat mount 108 relative to the frame 202 and/or the connector 902 about the pivot point 904. To fold the seat mount 108, the latch 910 is moved or withdrawn from the recess 912 to enable rotation of the seat mount 108 relative to the frame 202 and/or the connector 902. In the folded position 908, the latch 910 engages a second recess 914 to prevent the seat mount 108 from inadvertently or unintentionally pivoting about the pivot point 904 when the stroller 100 is in the collapsed state 800.

Figure 10:
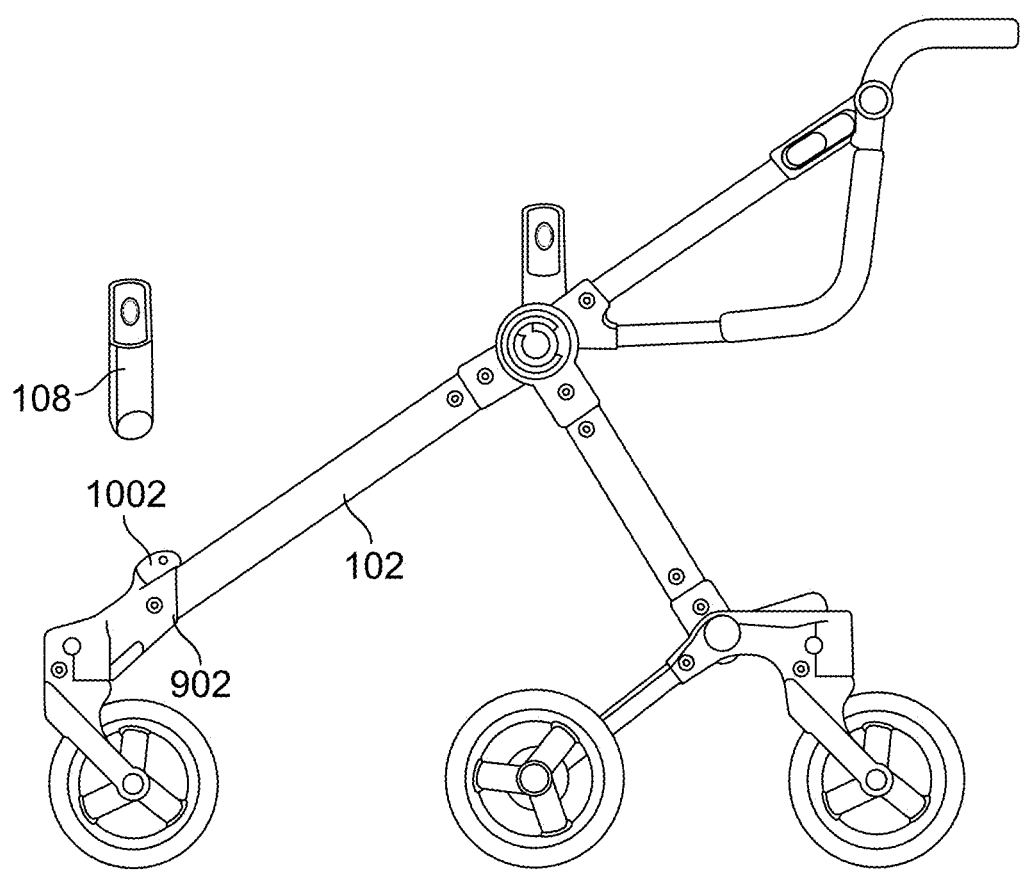
FIG. 10 illustrates another example seat mount disclosed herein.

In some examples, the seat mounts 108 may be removed relative to the frame 102 prior to or after the stroller 100 is in the folded position 800. For example, FIG. 10 illustrates the example seat mounts 108 being removed from an opening or pocket 1002 of the connector 902 or the frame 202. To remove the seat mounts 108 from the connector 902 and/or the frame 102, a lock or latch mechanism securing the seat mounts 108 to the connector 902 and/or the frame 102 is released and the seat mount 108 is removed from the opening 1002.

Figure 11:
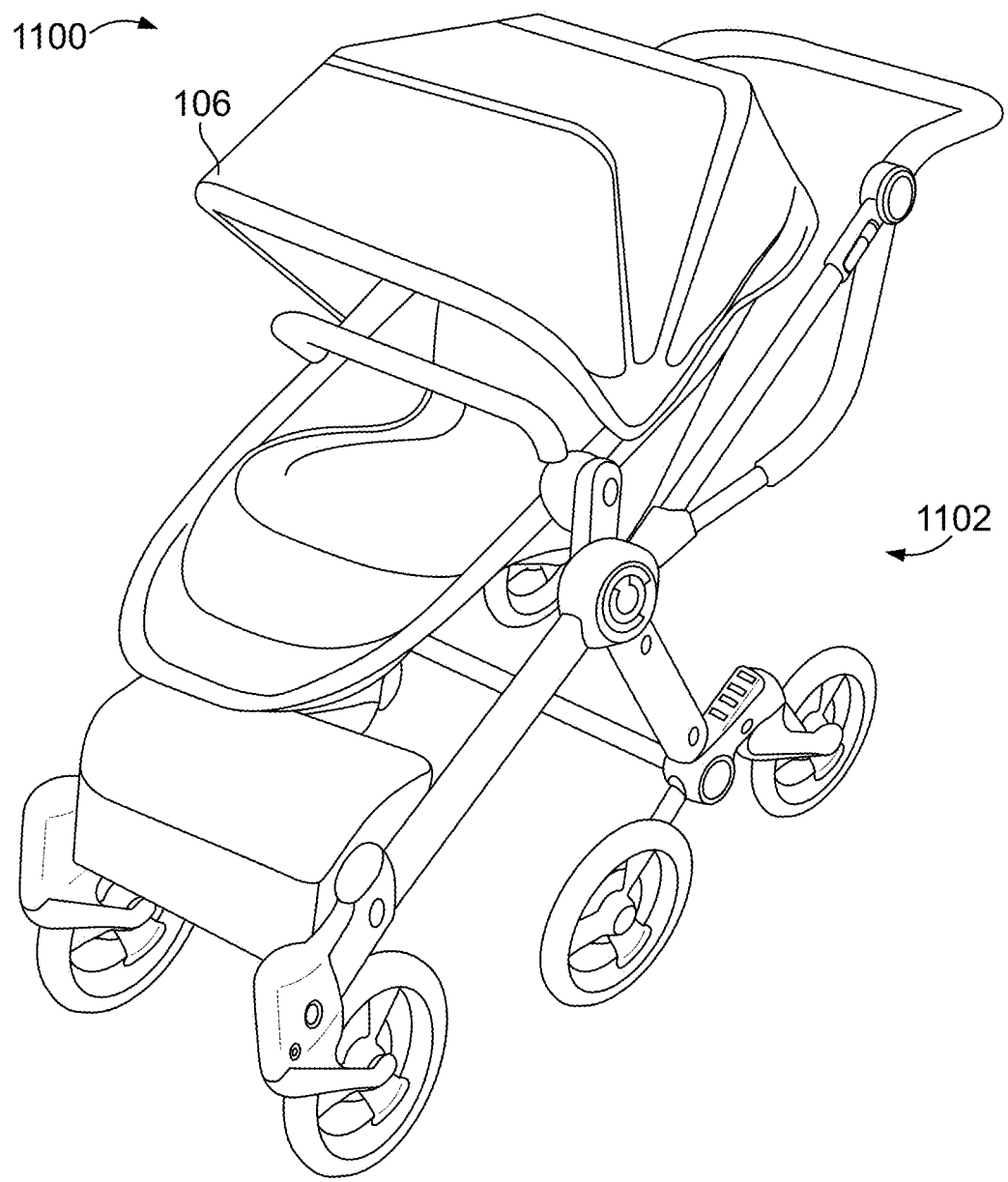
FIG. 11 illustrates another example stroller constructed in accordance with the teachings of this disclosure.

FIG. 11 illustrates another example stroller 1100. The example stroller 1100 of FIG. 11 is substantially similar or identical to the stroller 100 of FIGS. 1-8. However, unlike the stroller 100 of FIG. 1, the example stroller 1100 of FIG. 11 has only one infant seat 106. In some examples, the stroller 100 of FIG. 1 may be configured or converted to the stroller 1100 of FIG. 11. For example, one of the seats 106 of FIG. 1 may be removed from the frame 102 and the seat mounts 108 associated with the removed infant seat 106 may be removed from the frame 102. In the examples of FIGS. 1-11, the seat mounts 108 are bayonet-type mounts.

Figure 12:
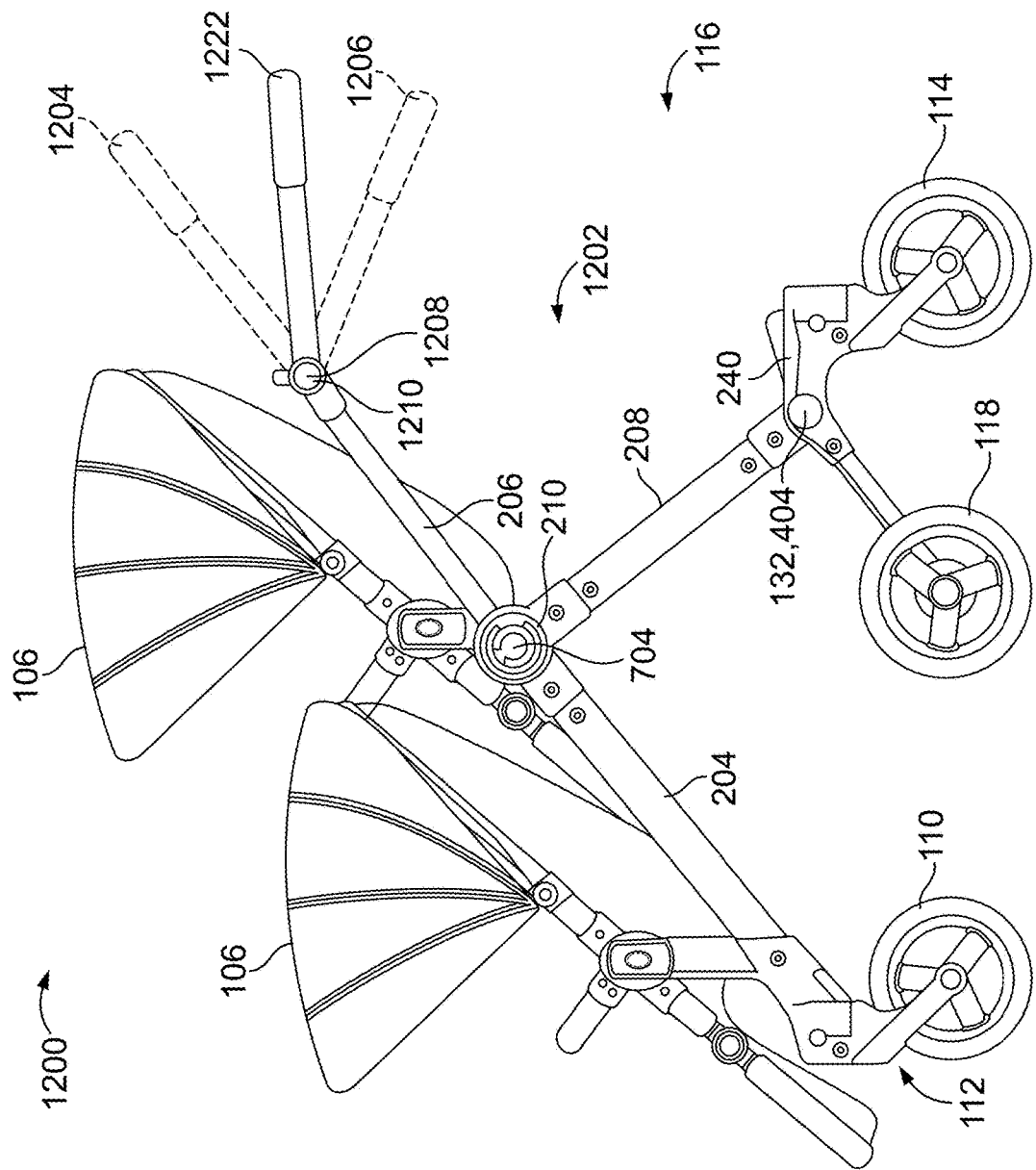
FIG. 12 is a side view of another example stroller constructed in accordance with the teachings of this disclosure.

FIG. 12 illustrates another example stroller 1200. Those components of the example stroller 1200 that are substantially similar or identical to the components of the example stroller 100 of FIGS. 1-8 described above and that have functions substantially similar or identical to the functions of those components will not be described in detail again below. Instead, the interested reader is referred to the above corresponding descriptions. To facilitate this process, similar reference numbers will be used for like structures. For example, in the illustrated example of FIG. 12, the example stroller 1200 includes a frame 1202 having one or more front wheels 110 to support a front end 112 of the frame 102 and one or more rear wheels 114 to support a rear end 116 of the frame 102. The frame 1202 of the illustrated example includes a first side frame assembly and a second side frame assembly laterally spaced from each other to accommodate one or more infant seats 106 extending between the side frame assemblies. Each of the side frame assemblies includes a lower frame support 204, an upper frame support 206 and an intermediate frame support 208 pivotally coupled about a pivot 704 provided by a pivot connector 210. A carriage or housing 240 pivotally couples an intermediate wheel 118 and a rear wheel 114 about a pivot point 404 provided by an axle 130 extending between the side frame assemblies of the frame 1202.

The example stroller 1200 of FIG. 12 has a frame 1202 that is substantially similar or identical to the frame 102 of the example stroller 100 of FIGS. 1-8. However, the stroller 1200 of the illustrated example of FIG. 12 has a different handle 1222. The handle 1222 may articulate between a first or upper position 1204 and a second or lower position 1206 relative to the upper frame support 206. To enable articulation of the handle 1222 relative to the upper frame support 206, the example stroller 1200 employs a pivot joint or articulation hub 1208. The hub 1208 employs a latch mechanism to lock or maintain a position of the handle 1222 between the upper and lower positions 1204, 1206. To release the latch mechanism to enable articulation of the handle 1222 between the upper and lower positions 1204, 1206, the frame 1202 includes a release 1210 (e.g., a push button).

Figure 13:
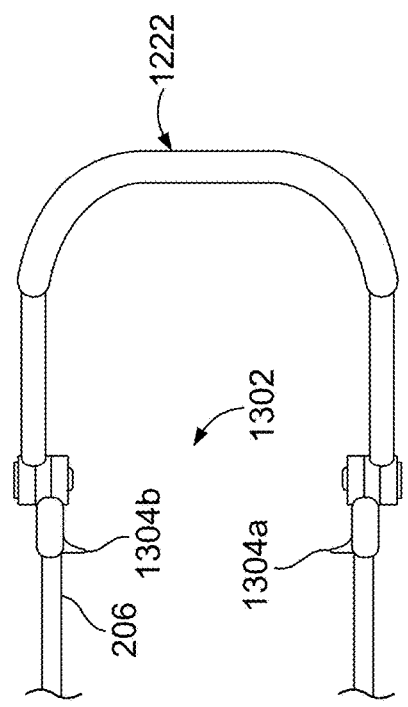
FIG. 13 is a top plan view of an example handle of the example stroller of FIG. 12.

FIG. 13 is a plan view of the example handle 1222 coupled to the upper frame support 206 of FIG. 12. As shown in the illustrated example of FIG. 13, the example stroller 1200 employs a latch release 1302 to collapse the stroller 1200 of the illustrated example. To activate the latch release 1302, one or more triggers 1304a, 1304b of the release are moved relative to the upper frame support 206 (e.g., pulled, pushed, twisted, slid, etc.) to unlock a latch or lock provided by the pivot connector 210. Additionally, the latch release 1302, when activated, also releases a latch mechanism of the hub 1208 to enable the handle 1222 to rotate relative to the upper frame support 206.

Figure 15:
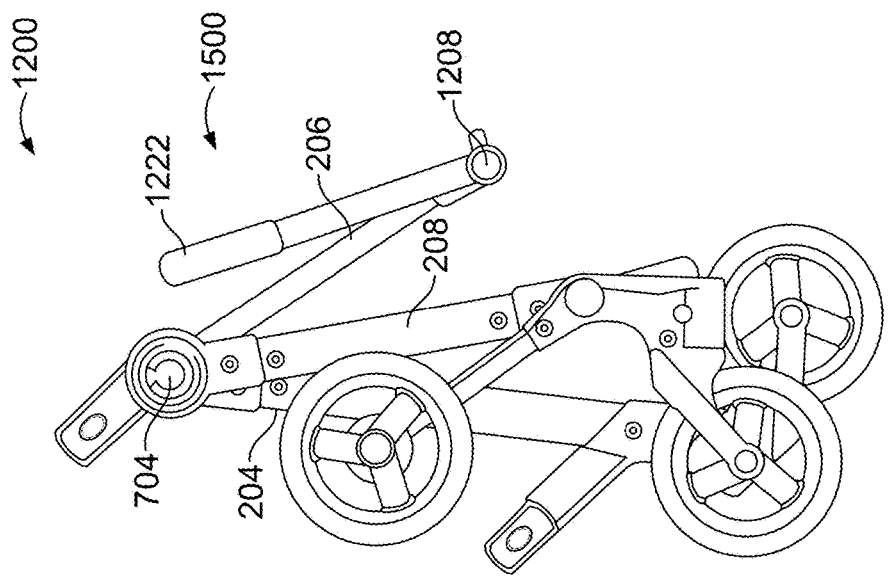
FIG. 15 is a side view of the example stroller of FIGS. 12-14, showing the stroller fully collapsed.
Figure 14:
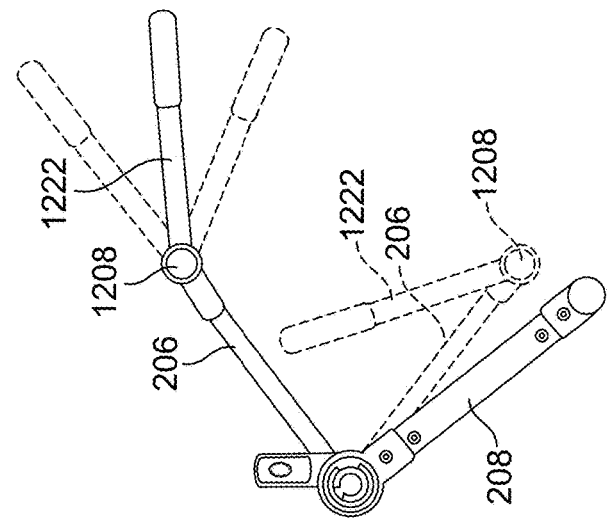
FIG. 14 is a side view of a portion of a frame of the example stroller of FIGS. 12 and 13 in a partially collapsed state.

FIGS. 14 and 15 illustrate the example stroller 1200 of FIG. 12 being folded from an in-use unfolded position shown in FIG. 12 to a collapsed, folded, or storage position 1500 shown in FIG. 15. More specifically, in the unlocked condition, the frame supports 204, 206 and/or 208 pivot relative to each other. Referring to FIG. 14, when the latch release 1302 is activated, the handle 1222 is pivoted about the hub 1208 toward the upper frame support 206 in a counterclockwise direction about the hub 1208 in the orientation of FIG. 14. The handle 1222 and the upper frame support 206 are then pivoted toward the intermediate frame support 208.

The lower and upper frame supports 204, 206 rotate relative to the intermediate frame support 208 about the pivot 704. As shown in FIG. 15, in the fully collapsed, folded or storage position 1500, the stroller 1200 of the illustrated example has a relatively low profile or dimensional envelope.

Figure 16:
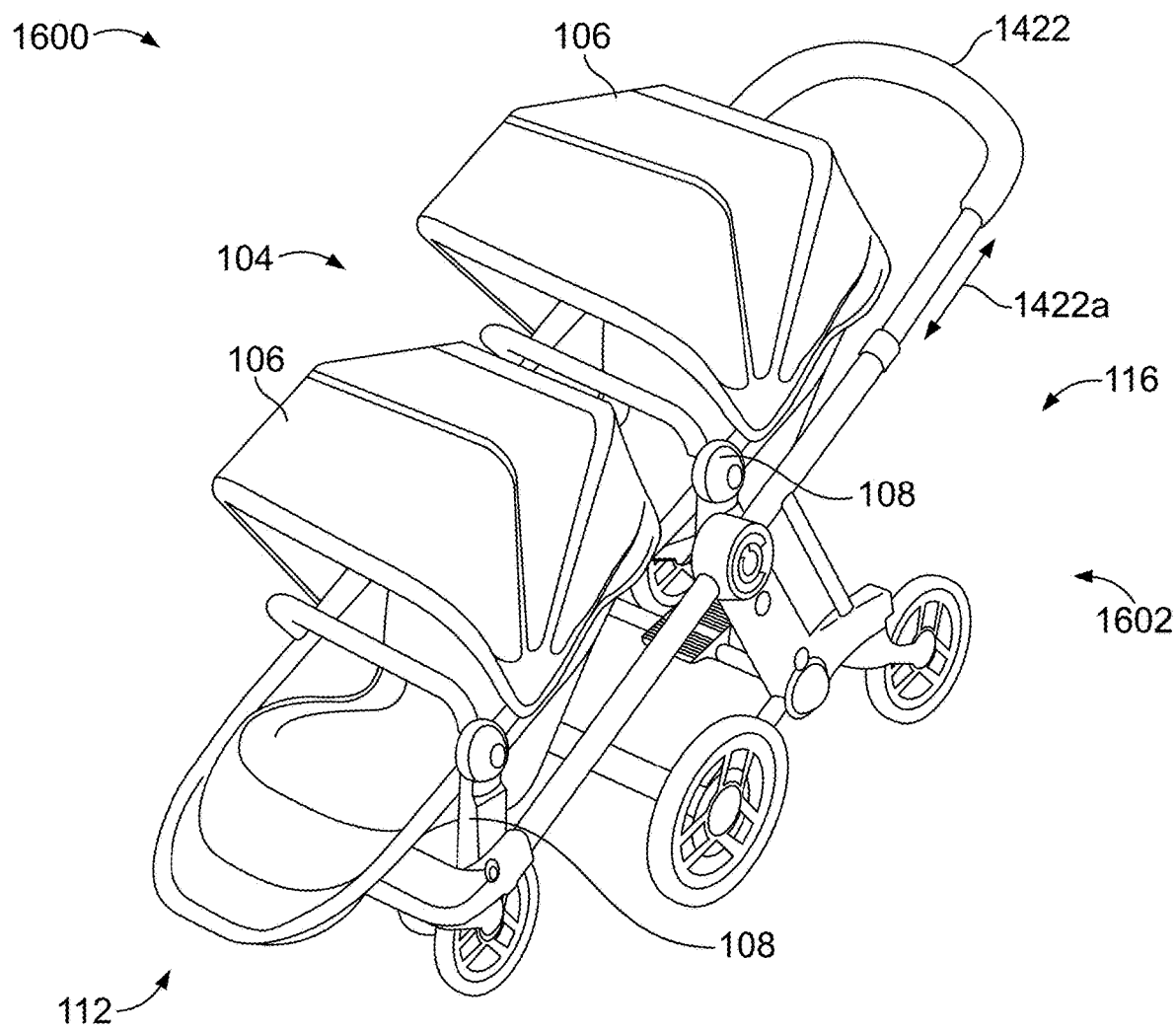
FIG. 16 is a perspective view of another example stroller constructed in accordance with the teachings disclosed herein.

FIG. 16 illustrates another example stroller 1600 configured in accordance with the teachings disclosed herein. Those components of the example stroller 1600 that are substantially similar or identical to the components of the example stroller 100 described above and that have functions substantially similar or identical to the functions of those components will not be described in detail again below. Instead, the interested reader is referred to the above corresponding descriptions. To facilitate this process, similar reference numbers will be used for like structures.

FIG. 16 is a perspective view of the example stroller 1600. In the illustrated example of FIG. 16, the example stroller 1600 includes a frame 1602 that defines a seating area 104 to receive one or more infant seats 106. The frame 1602 of the illustrated example employs seat mounts 108 to receive or couple the infant seats 106 to the frame 1602. In some examples, the mounts 108 may be adjusted relative the frame 1602. To enable a user to push, turn and/or tilt the stroller 1600 of the illustrated example, the frame 1602 includes a handle 1622. The handle 1622 of the illustrated example is telescopically adjustable relative to the frame 1602 in a direction 1622a.

The frame 1602 of the illustrated example is supported by one or more front wheels 110 at a front end 112 of the frame 1602 and one or more rear wheels 114 at a rear end 116 of the frame 1602. The frame 1602 of the illustrated example is assembled to form a structure which is intended to stay assembled in all phases of its use and storage. Additionally, for the purposes of improving maneuverability, control steering and/or to provide shock absorption, the frame 1602 of the illustrated example employs one or more intermediate wheels 118 disposed between the front and rear wheels 110, 114. To provide shock absorption to the example stroller 1600, the intermediate wheels 118, the front wheels 110 and/or the rear wheels 114 of the illustrated example may be implemented by air inflatable wheels composed of rubber.

In addition, the intermediate wheel 118 of the illustrated example has a diameter that is larger than diameters of the respective front and rear wheels 110, 114. In this example, the diameters of the respective front and rear wheels 110, 114 are substantially the same. Thus, the front and rear wheels 110, 114 engage a travel surface with a relatively smaller portion or contact area than the intermediate wheel 118. As a result, rolling friction of the front and/or rear wheels 110, 114 is reduced because the contact areas of the respective front and rear wheels 110, 114 that engage a travel surface are relatively smaller compared to the contact area of the intermediate wheels 118 which engages the travel surface. Further, the larger diameter of the intermediate wheels 118 permits the stroller 1600 of the illustrated example to roll over rough or uneven surfaces without difficulty. However, in other examples, the diameter of the intermediate wheels 118 is be substantially similar or identical to a diameter of the front wheels 110 and/or the rear wheels 114.

Figure 17:
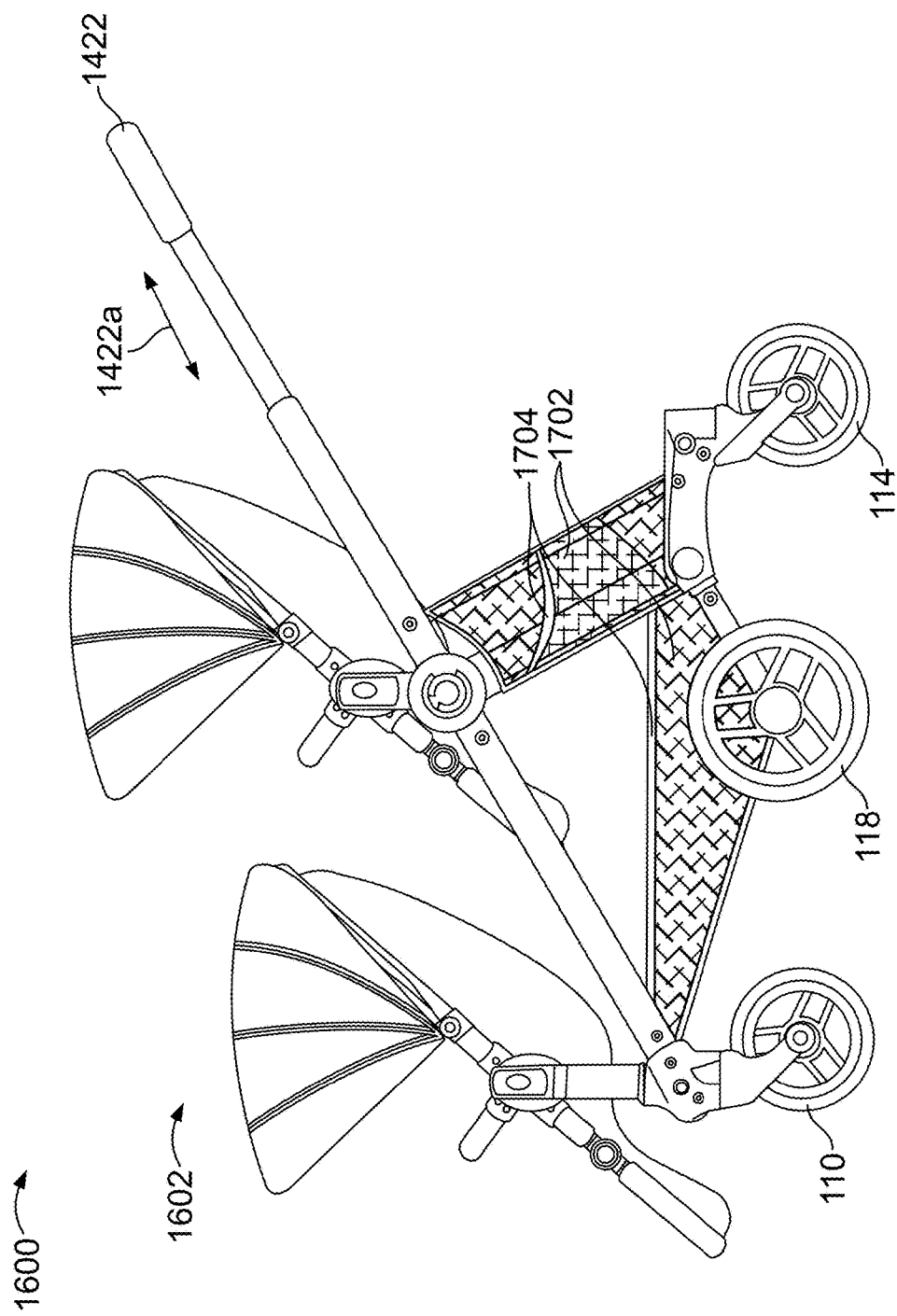
FIG. 17 is a side view of the example stroller of FIG. 16 having soft goods.

FIG. 17 is a side view of the example stroller 1600 having soft goods 1702 to define one or more storage areas 1704. In the illustrated example of FIG. 17, the intermediate wheels 118 of the example stroller 1600 are positioned at approximately a midpoint between the front and rear wheels 110, 114. Each intermediate wheel 118 of the illustrated example defines a pivot point disposed between the front and rear wheels 110, 114. In other words, each of the intermediate wheels 118 provides a pivot point for the stroller 1400 that is offset or laterally spaced from the rear end 116 of the stroller 1400 and/or the rear wheels 114. The pivot points provided by the intermediate wheels 118 enable the stroller 1400 to be turned leftward or rightward with relative ease when a sideways or substantially horizontal force is applied to the handle 1422.

Figure 18:
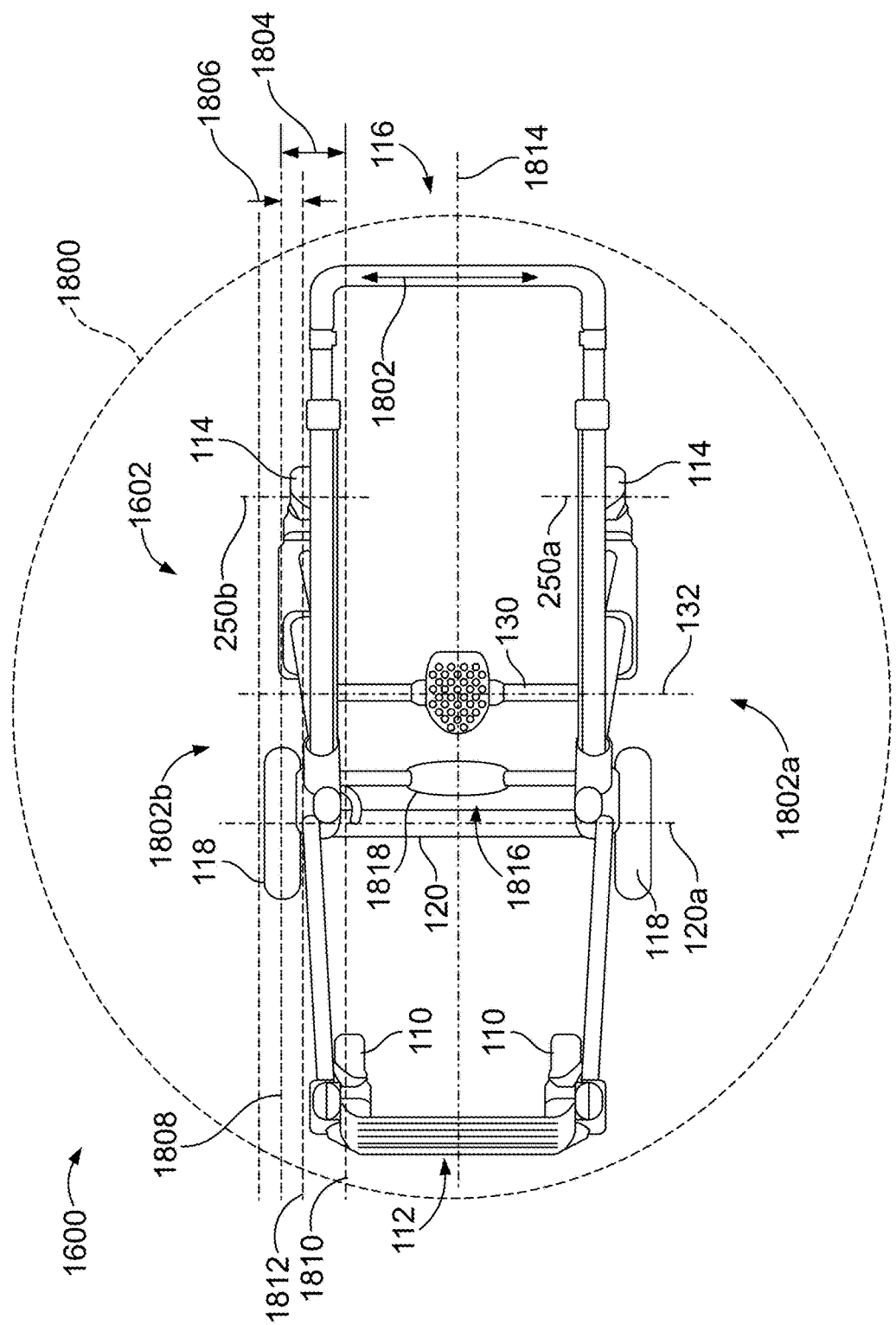
FIG. 18 is a top plan view of the example stroller of FIGS. 16 and 17.

FIG. 18 is a top plan view of the example stroller 1400 of FIG. 14. As shown in FIG. 18, the offset pivot points provided by the intermediate wheels 118 enables both the front end 112 of the stroller 1400 and the rear end 116 of the stroller 1400 to pivot or rotate in an arcuate path relative to the turning pivot provided by one of the intermediate wheels 118. For example, a user can apply a turning force 1802 to the handle 1622 to turn the stroller 1600 of the illustrated example about a pivot point provided by one of the intermediate wheels 118. As a result, the stroller 1600 of the illustrated example can turn about a pivot point provided by either of the intermediate wheels 118 with a relatively tight turning radius and with relative ease. For example, the stroller 1600 can turn in the arcuate path a full 360 degrees substantially within its own length as reflected by the circle 1800 in FIG. 18.

In the illustrated example, the frame 1602 defines a first side frame assembly 1802a and a second side frame assembly 1802b laterally spaced from the first side frame assembly 1802a to define the seating area 104. The intermediate wheels 118 of the illustrated example are coupled to one another via an axle 120 extending between the side frame assemblies 1802a, 1802b. However, in other examples, a common axle 120 may not be used and the intermediate wheels 118 may then be free to drive or rotate independently relative to each other.

Additionally, to provide a pivot axis 132 when the front end 112 of the frame 1602 is raised, lifted, tilted or otherwise elevated relative to the rear end 116 of the frame 1602 (e.g., a downward force is applied to the handle 1622 perpendicular to the turning force 1802), the example stroller 1600 of the illustrated example employs an axle 130. In the illustrated example, the pivot axis 132 is positioned between the intermediate wheels 118 and the rear wheels 114. In other words, the pivot axis 132 is offset relative to an axis of rotation 120a of the intermediate wheels 118 and the respective axes of rotation 250a, 250b of the rear wheels 114.

For the purposes of improving stability and/or to facilitate collapsing the stroller 1400 with little or no interference, the intermediate wheels 118 of the illustrated example are offset a (e.g., horizontal) distance 1804 relative to the front wheels 110 and a distance 1806 relative to the rear wheels 114. More specifically, when the stroller 1600 is moving in a straight line, the intermediate wheels 118 of the illustrated example travel along a line or path 1808 that extends outside of a line or path 1810 along which the front wheels 110 fall or travel and outside a line or path 1812 along which the rear wheels 114 fall or travel. While the intermediate wheels 118 of the illustrated example are spaced a further distance from a longitudinal center line 1814 of the stroller 1600 than the front and rear wheels 110, 114, in other examples, the intermediate wheels 118 may be aligned with the front and rear wheels 110, 114, may be offset inward of the front and/or rear wheels 110, 114 (i.e., be closer to the longitudinal center line 1814), and/or may be offset outbound of a first one of the front and rear wheels 110, 114 and inbound of a second different one of the front and rear wheels 110, 114. In some examples, the front wheels 110 and the rear wheels 114 fall along the same line or travel path when the stroller 1400 is moving forward in a straight line.

To collapse the stroller 1600, the frame 1602 of the illustrated example includes a latch release mechanism 1816. To activate the latch release mechanism 1816, the latch release mechanism 1816 of the illustrated example includes a handle 1818. The handle 1818 is supported on a cross-bar or tube 1820 extending across the side frame assemblies 1802a, 1802b. The handle 1818 is located or positioned adjacent the seat mount 108 or the upper frame support 206 just under the infant seat 106 of the seating area 104. Such location facilitates access when the infant seats 106 are removed from the seat mounts 108.

Figure 19:
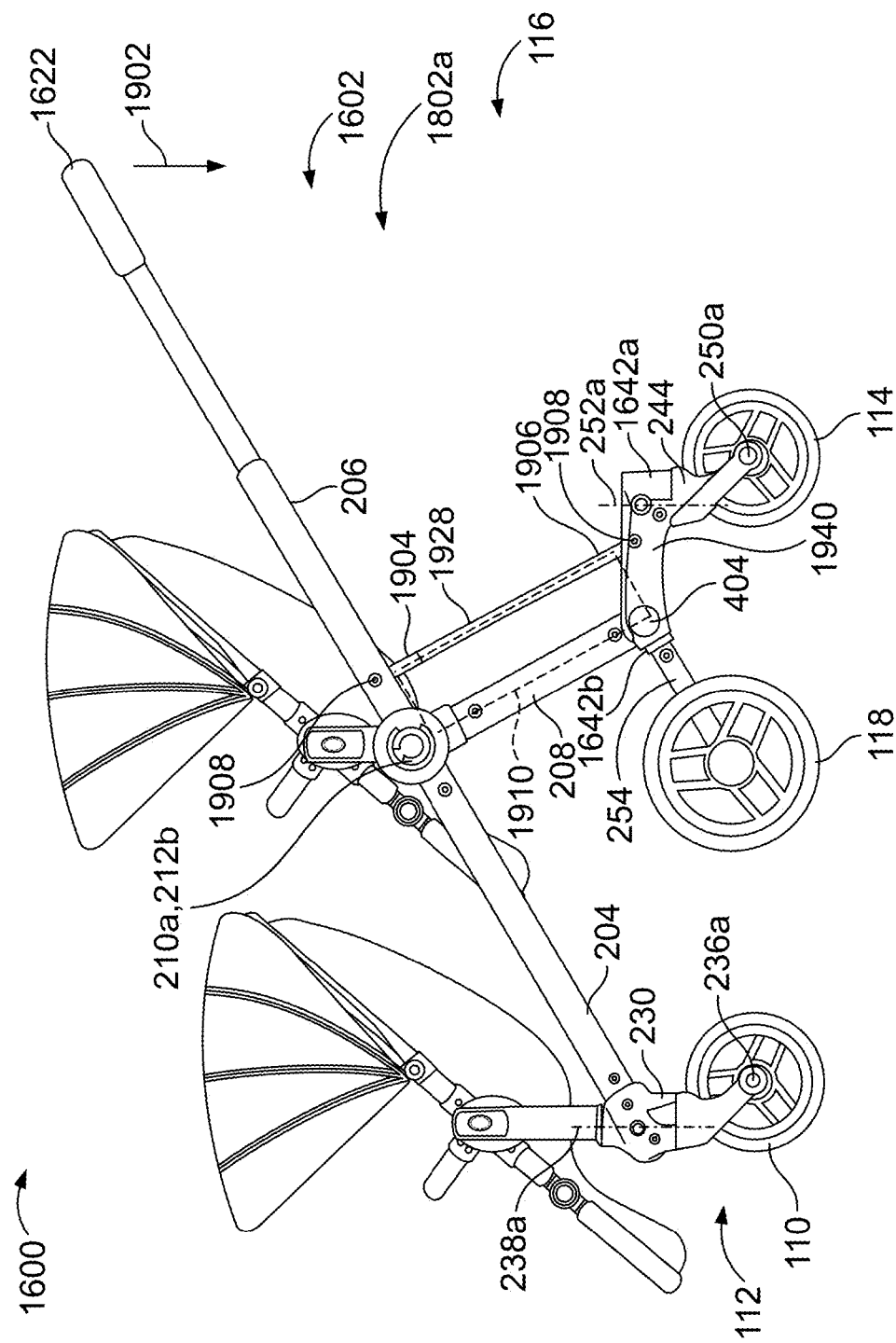
FIG. 19 is a left side view of the example stroller of FIGS. 16-18, but having soft goods removed for clarity.
Figure 20:
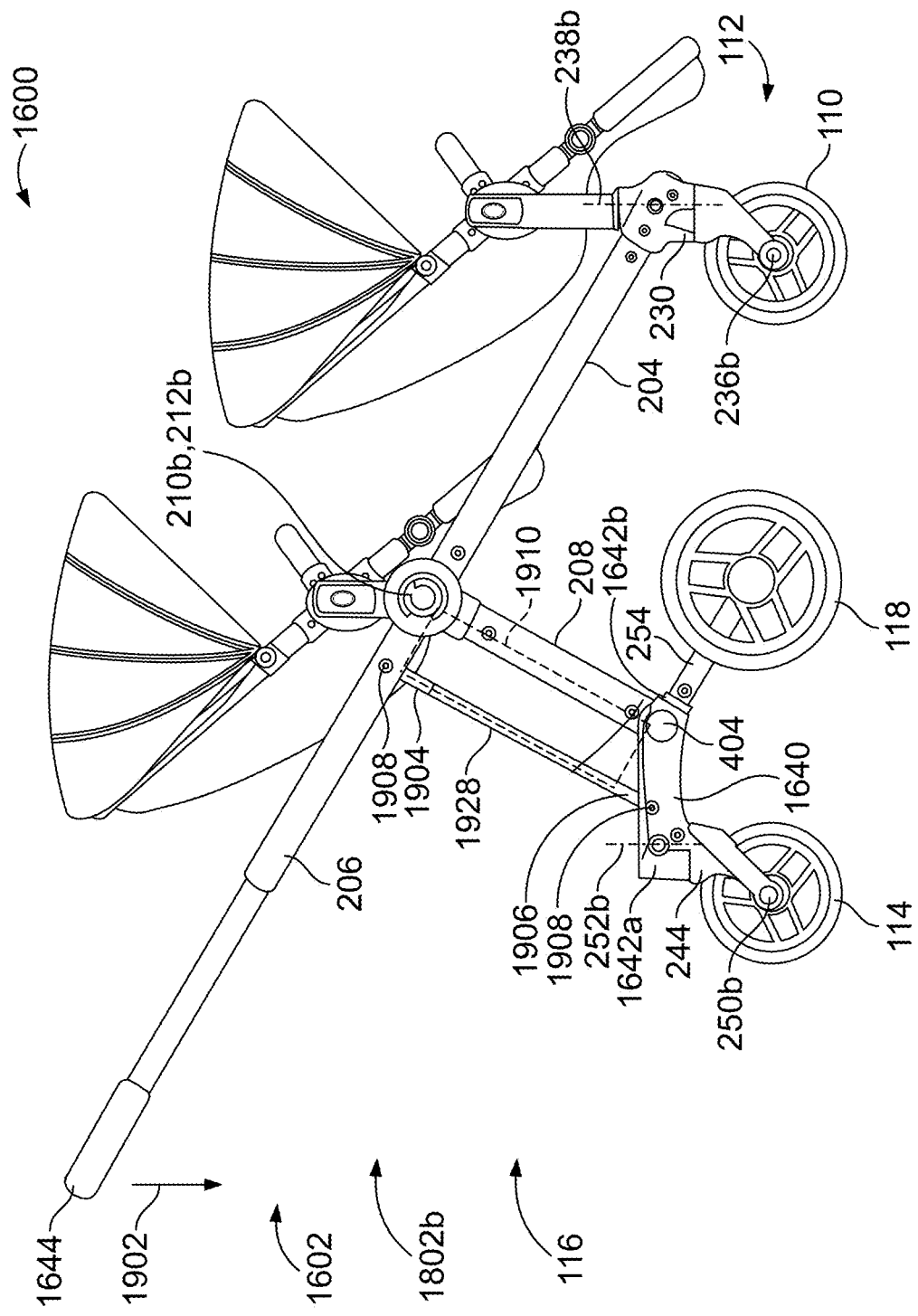
FIG. 20 is a right side view of the example stroller of FIGS. 16-19.

FIG. 19 is a left side view of the side frame assembly 1802a of the example stroller 1600 of FIGS. 16-18. FIG. 20 is a right side view of the side frame assembly 1802b of the example stroller 1600 of FIGS. 16-18. Referring to FIGS. 19 and 20, each of the side frame assemblies 1802a, 1802b includes a lower frame support 204, an upper frame support 206 and an intermediate frame support 208 pivotally coupled about a pivot connector 210a, 210b or a hub 212a, 212b.

To couple the front wheels 110 to the frame 1602, the side frame assemblies 1802a, 1802b employ a front wheel housing 230. The front wheel housing 230 enables each of the front wheels 110 to rotate independently about a separate (e.g., horizontal) axis of rotation 236a, 236b and enables each of the front wheels 110 to swivel or pivot about a vertical axis 238a, 238b.

To mount or attach the rear wheels 114 and the intermediate wheels 118 to the respective side frame assemblies 1802a, 1802b, each of the side assemblies 1802a, 1802b of the illustrated example employs a housing, hub or carriage 1940 (e.g., a boogie). Each of the carriages 1640 of the illustrated example includes a hub, leg or port 1642a to receive a rear wheel housing 244 on which the rear wheel 114 is mounted and a hub, port or leg 1642b to receive an arm or portion 254 coupled to the intermediate wheel 118.

Because the left and right carriages 1640 are substantially identical, the following description will focus on one carriage 1640 to serve as the description for both carriages 1640.

The rear wheel housing 244 of the illustrated example enables each of the rear wheels 114 to rotate independently about a separate axis of rotation 250a, 250b and enables each of the rear wheels 114 to swivel or pivot about a substantially vertical axis 252a, 252b substantially perpendicular to the respective axis of rotation 250a, 250b. The carriage or housing 1940 pivotally couples a respective pair of the intermediate wheels 118 and the rear wheels 114 relative to the intermediate frame support 208 about the pivot axis 132 provided by the axle 130.

To improve stability and/or facilitate balancing when maneuvering the stroller 1600 over a curb or other obstacle, the example stroller 1600 of the illustrated example employs a suspension apparatus 1928. The suspension apparatus 1928 of the illustrated example provides stability and/or facilitates balancing when the front end 110 of the stroller 1600 is pivoted or tilted relative to the rear end 112 of the frame 1602 about the pivot axle 130 (e.g., an upward direction relative to a support surface (e.g., the ground)). The suspension apparatus 1928 of the illustrated example helps prevent the intermediate wheels 118 and/or the rear wheels 114 from disengaging and/or lifting off of a travel surface (e.g., the ground) when the stroller 1600 is pushed along a path and/or tilted or pivoted about the pivot axis 132. For example, to pivot or lift the front wheels 110 relative to the rear end 112 of the stroller 1600, a downward force is applied to the handle 1622. This downward force 1902 has a component that is substantially perpendicular to the turning force 1802 applied to the handle 1622 to turn or pivot the stroller 1600 about one of the intermediate wheels 118. As a result, the suspension apparatus 1928 helps maintain the intermediate wheels 118 and the rear wheels 114 engaged with a travel path when the front end 110 of the stroller 1600 is lifted about the pivot axis 132.

In the illustrated example, the suspension apparatus 1928 is positioned adjacent and parallel to the intermediate frame support 208. In the illustrated example, the suspension apparatus 1928 includes a first end 1904 attached or coupled to the upper frame support 206 and a second end 1906 attached or coupled to the carriage 1940. In the illustrated example, the first end 1904 is coupled (e.g., fixed or pivotally coupled) to the upper frame support 206 and second end 1906 is coupled (e.g., fixed or pivotally coupled) to the carriage 1940 via fasteners 1908 (e.g., pins, etc.). The upper frame support 206, the carriage 1940, the suspension apparatus 1928 and the intermediate frame support 208 define a four bar linkage 1910. This linkage 1910 helps to assist rotating the carriage 1940 when folding the stroller 1600 as discussed in greater detail below. In the illustrated example, the linkage 1910 defines a parallelogram. However, in other examples, the linkage 1910 may have any other suitable shape and/or configuration.

Figure 21:
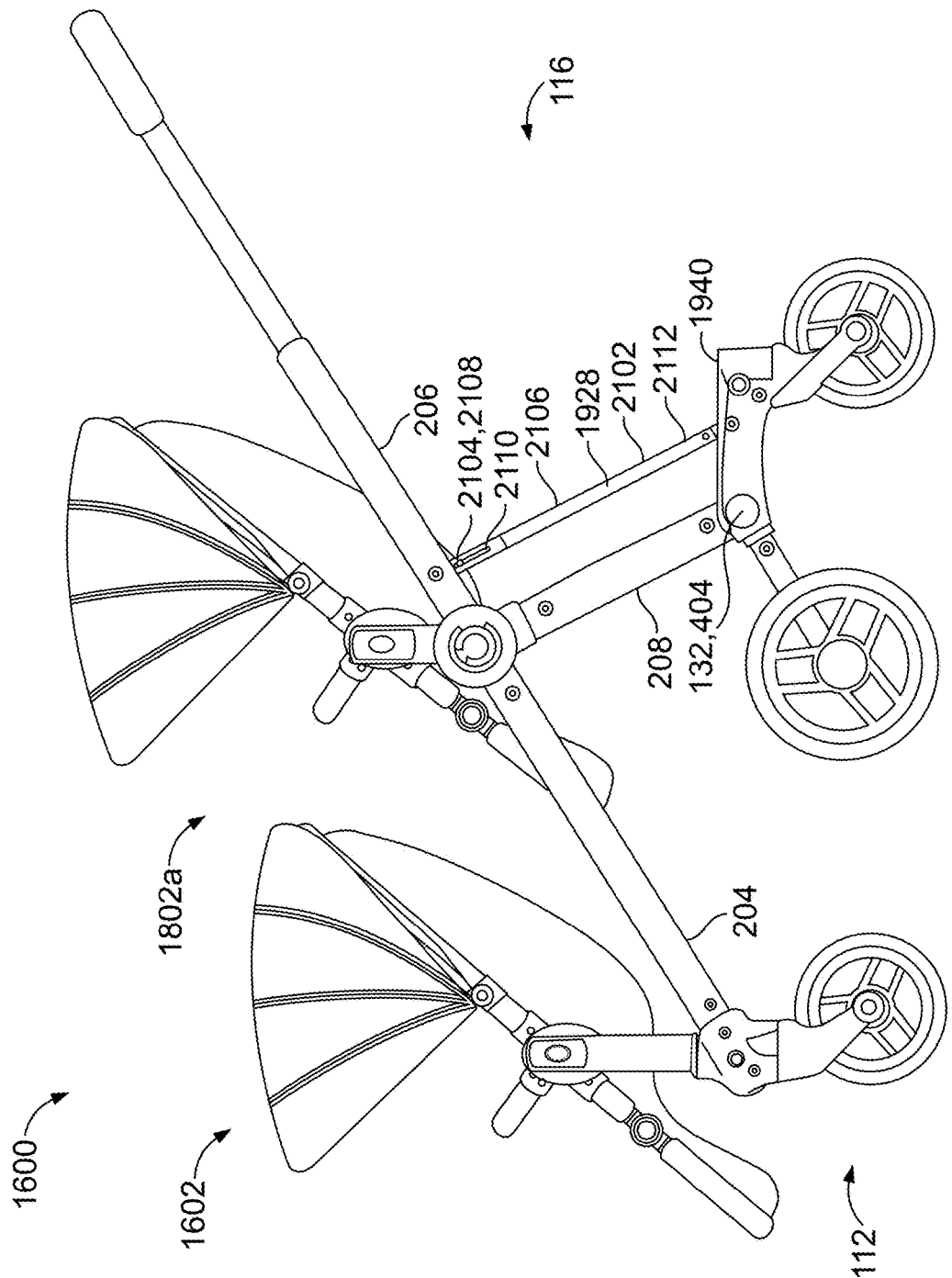
FIG. 21 is a side view of the example stroller of FIGS. 16-20 showing an example suspension apparatus of the example stroller.

FIG. 21 is a side view of the example stroller 1600 of FIGS. 14-20 with a partial cutaway view of the example suspension apparatus 1928. The example suspension apparatus 1928 of the illustrated example is a compression spring 2102. To enable the compression spring 2102 to compress when the front end 112 of the stroller 1600 is tiled or lifted about the pivot axis 132 or pivot 404 relative the rear end 116 of the stroller 1600, the compression spring 2102 includes a first portion 2104 slidably coupled to a second portion 2106. More specifically, the first portion 2104 is fixed or coupled (e.g., pivotally coupled) to the upper frame support 206 and the second portion 2106 is fixed or coupled (e.g. pivotally coupled) to the carriage 1940. The first portion 2104 includes a pin or slider 2108 that slides or moves along a slot 2110 formed in the second portion 2106. Thus, when the front end 112 of the stroller 1600 is lifted about the pivot axis 132 provided by the axle 130, the first portion 2104 of the compression spring 2102 slides in the slot 2110 relative to the second portion 2106 to compress/decompress a spring positioned in a spring cylinder 2112.

Figure 22A:
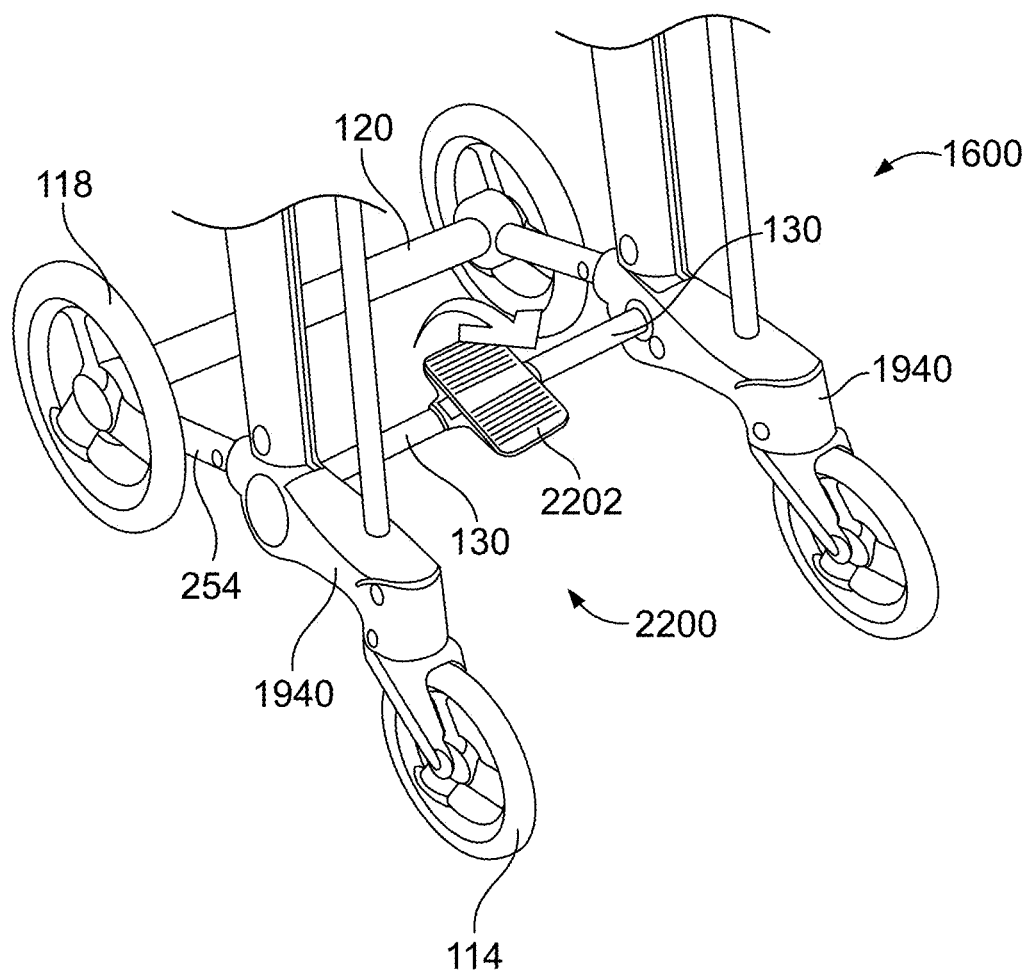
FIG. 22A-22D illustrate an example brake mechanism of the example stroller of FIGS. 16-21.
Figure 22B:
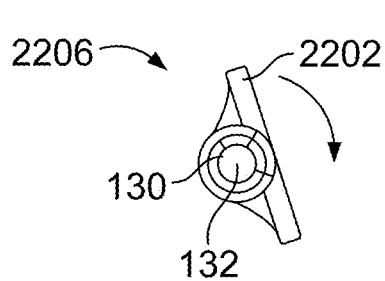
Figure 22C:
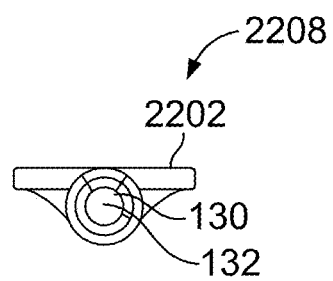

FIGS. 22A-22D illustrate an example brake mechanism 2200 of the example stroller 1600. The brake mechanism 2200 of the illustrated example is supported by the shared axle 120 of the intermediate wheels and a brake lever or foot pedal 2202 of the example brake mechanism 2200 is supported by the axle 130. As shown in FIGS. 22B and 22C, respectively, the brake lever 2202 of the illustrated example is selectively movable or rotatable about the pivot axis 132 of the axle between a locked position 2204 to restrict or prevent rotation of the intermediate wheels 118 and an unlocked position 2206 to enable or facilitate rotation of the intermediate wheels 118. The brake lever 2202 of the illustrated example includes a visual indicator 2208 (e.g., a color indicator) representative of the brake lever 2202 being in the locked position 2204 and the unlocked position 2206.

Figure 22D:
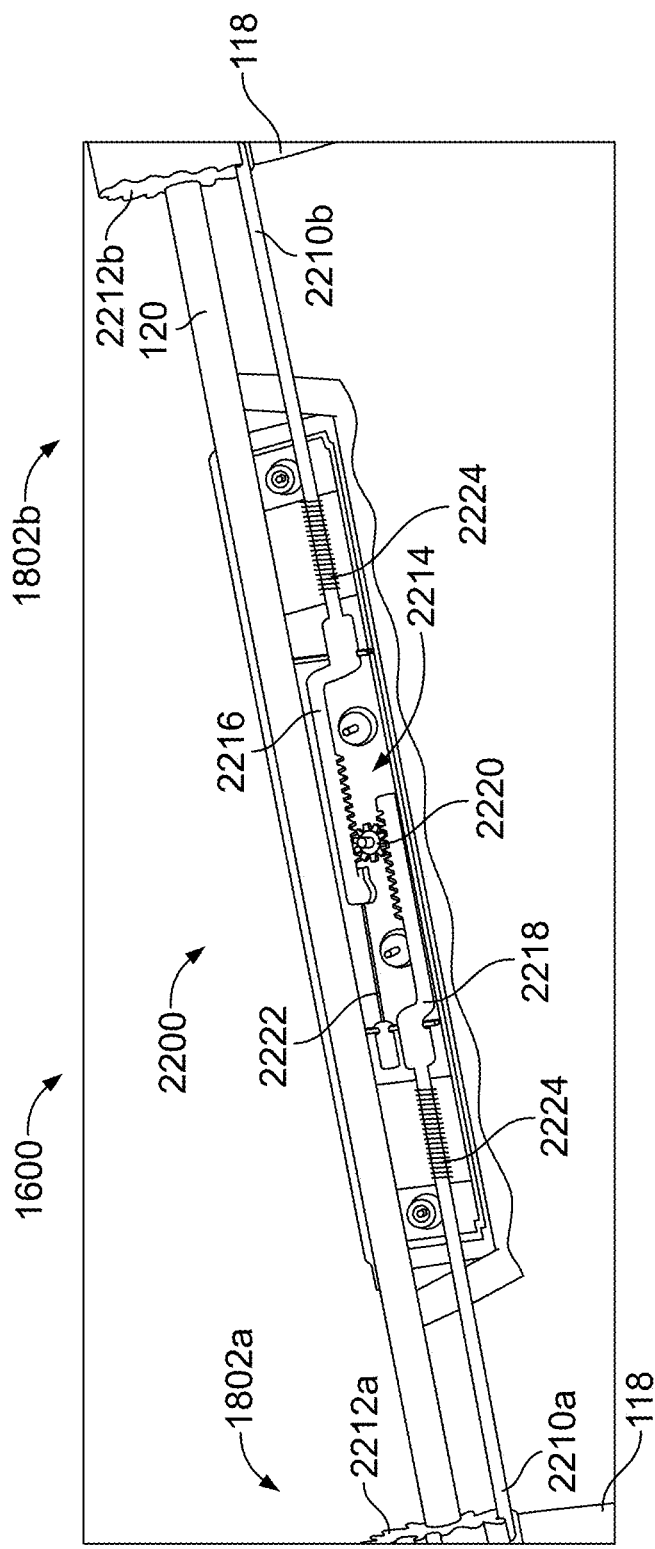

Referring also to FIG. 22D, the brake lever 2202 of the illustrated example is actuated or rotated relative to the axle 130 to activate a plunger 2210a, 2210b which is movable relative to a locking interface 2212a, 2212b (e.g., a plurality of protrusions on a hub) of the intermediate wheels 118. To move the plunger 2210a, 2210b relative to the respective locking interface 2212a, 2212b of the intermediate wheel 118, the brake mechanism 2200 of the illustrated example employs an actuator 2214. The actuator 2214 of the illustrated example is a rack and pinion gear assembly having two racks 2216, 2218 positioned between a gear 2220. The rack 2216 of the illustrated example actuates the plunger 2210b and the rack 2218 of the illustrated example actuates the plunger 2210b. To actuate the racks 2216, 2218, the brake mechanism 2200 of the illustrated example employs a cable 2222. More specifically, a first end of the cable 2222 is attached to the rack 2216 and a second end of the cable 2222 is attached to the brake lever 2202. The cable 2222 of the illustrated example is routed to the brake lever 1922 via the arm 254 of the carriage 1640. FIG. 22D illustrates the brake mechanism 2200 in the locked condition. To unlock the intermediate wheels 118, the brake lever 2202 of the illustrated example is rotated to the unlocked position 2206 (FIG. 22). As a result, the cable 2222 moves (e.g., pulls) the rack 2216 toward the rack 2218 and causes the plunger 2210b to disengage the interface 2212b. Simultaneously, as the rack 2216 moves toward rack 2218, the rack 2218 move toward the rack 2216 via the gear 2220, thereby causing the plunger 2210a to disengage the interface 2212a. The actuator 2214 of the illustrated example employs biasing elements 2224 to bias or help move the racks 2216, 2218. The actuator 2214 of the illustrated example includes a housing 2226 that is coupled or supported by the axle 120.

Figure 24:
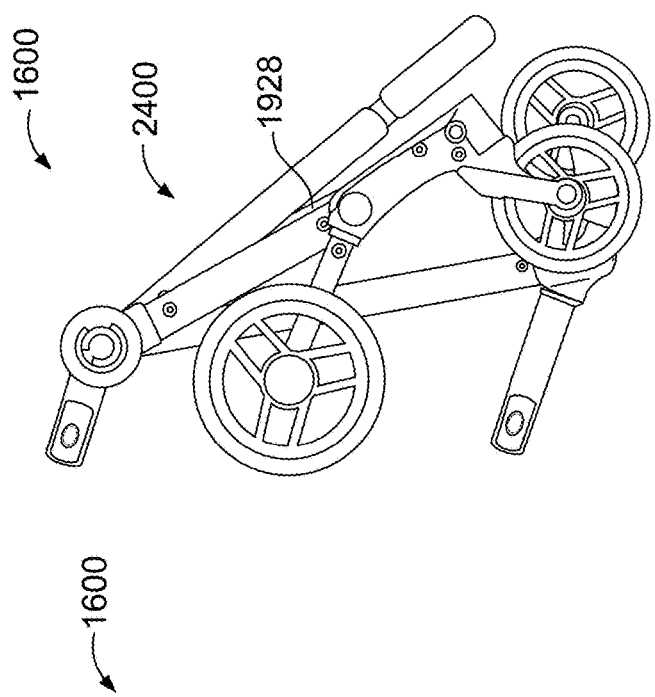
FIG. 24 is a side view of the example stroller of FIGS. 16-21 showing the stroller fully collapsed.
Figure 23:
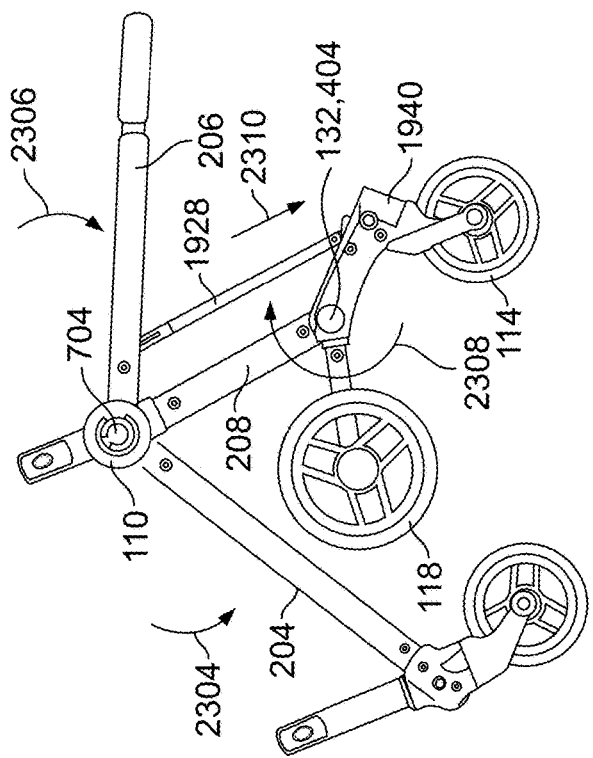
FIG. 23 is a side view of the example stroller of FIGS. 16-21 showing the stroller partially collapsed.

FIGS. 23 and 24 illustrate the example stroller 1400 of FIGS. 14-18 being folded from an in-use unfolded position shown in FIGS. 14-21 and 22A-22D to a collapsed, folded, or storage position 2400 shown in FIG. 24. As noted above, the side frame assemblies 1802a, 1802b are constructed such that the entire stroller 1600 of the illustrated example is selectively moveable between an extended, unfolded, in-use position (FIGS. 14-18 and 22A-22D) and a collapsed, folded, or storage position 2400 (FIG. 24).

Figure 25B:
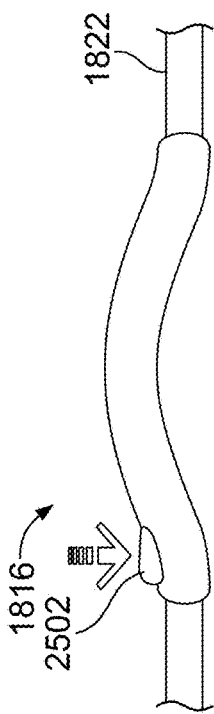
FIGS. 25A and 25B illustrate an example latch release mechanism of the example stroller of FIGS. 16-21.
Figure 25A:
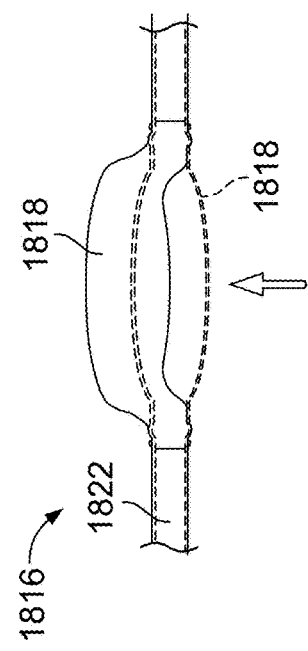

FIGS. 25A and 25B illustrate the latch release mechanism 1816 of FIG. 18. Referring to FIGS. 23-24 and 25A-25B, to collapse the stroller 1600 of the illustrated example, a latch or lock of the pivot connector 210a, 210b is released via the latch release mechanism 1816. In the unlocked position, the pivot connector 110a, 110b of the illustrated example enables the frame supports 204, 206 and/or 208 to rotate or pivot relative to each other about a pivot 704 provided by the pivot connectors 210a, 210b, the latch release mechanism 1816 of the illustrated example is activated. To unlock the pivot connector 210a, 210b, the handle 1818 of the illustrated example is first lifted (e.g., upward) away from the frame 1602 after the infants seats 106 have been removed from the seat mounts 108. After the handle 1818 is lifted, a trigger 2502 of the example latch release mechanism 1816 is actuated (e.g., depressed) by a user to enable the frame 1602 to collapse. When activated, the latch release mechanism 1816 of the illustrated example moves a plunger via any suitable means (e.g., switch, lock release, pull cord, etc.) out of engagement with a locking interface of the pivot connector 210a, 210b to enable the frame supports 204, 206 and 208 to pivot relative to each other about the pivot 704. The trigger 2502 of the illustrated example is coupled to the plunger via a cable or strap positioned in a housing or tube 1820 of the latch release mechanism 1816. The example latch mechanism 1818 enables one-hand operation to collapse the stroller 1600.

In the illustrated example of FIG. 23, the lower and upper frame supports 204, 206 of the illustrated example pivot toward the intermediate frame support 208 in the direction shown by the respective arrows 2304 and 2306. Additionally, the carriage 1940 of the illustrated example also rotates toward the intermediate frame support 208 in a direction represented by arrow 2308 when folding the stroller 1600 to the folded position 2400.

In particular, as the upper frame support 206 pivots toward the intermediate frame support 208, the suspension apparatus 1928 acts as a lever by moving toward the rear wheels 114 in the direction arrow 2310 to cause the carriage 1940 to pivot in the direction of arrow 2312 about the pivot axis 132. As a result, the suspension apparatus 1928 causes the intermediate wheels 118 to pivot toward the intermediate frame support 208 simultaneously (via the carriage 1940) as the upper frame support 206 pivots toward the intermediate frame support 208.

As shown in FIG. 24, in the fully collapsed, folded or storage position 2400, the stroller 1600 of the illustrated example has a relatively low profile or dimensional envelope. As shown in FIG. 24, the suspension apparatus 1928 does not interfere with collapsing the stroller 1600 to the folded position 2400. While a collapsible frame 1602 is shown, some example strollers may not collapse.

In some examples, the suspension apparatus 1928 is implemented by a torsion spring coupled to the axle 130. Further, the compression spring 2102 of the illustrated example may be replaced by an auxiliary frame member or rod to assist in collapsing the example stroller 1600.

Figure 26:
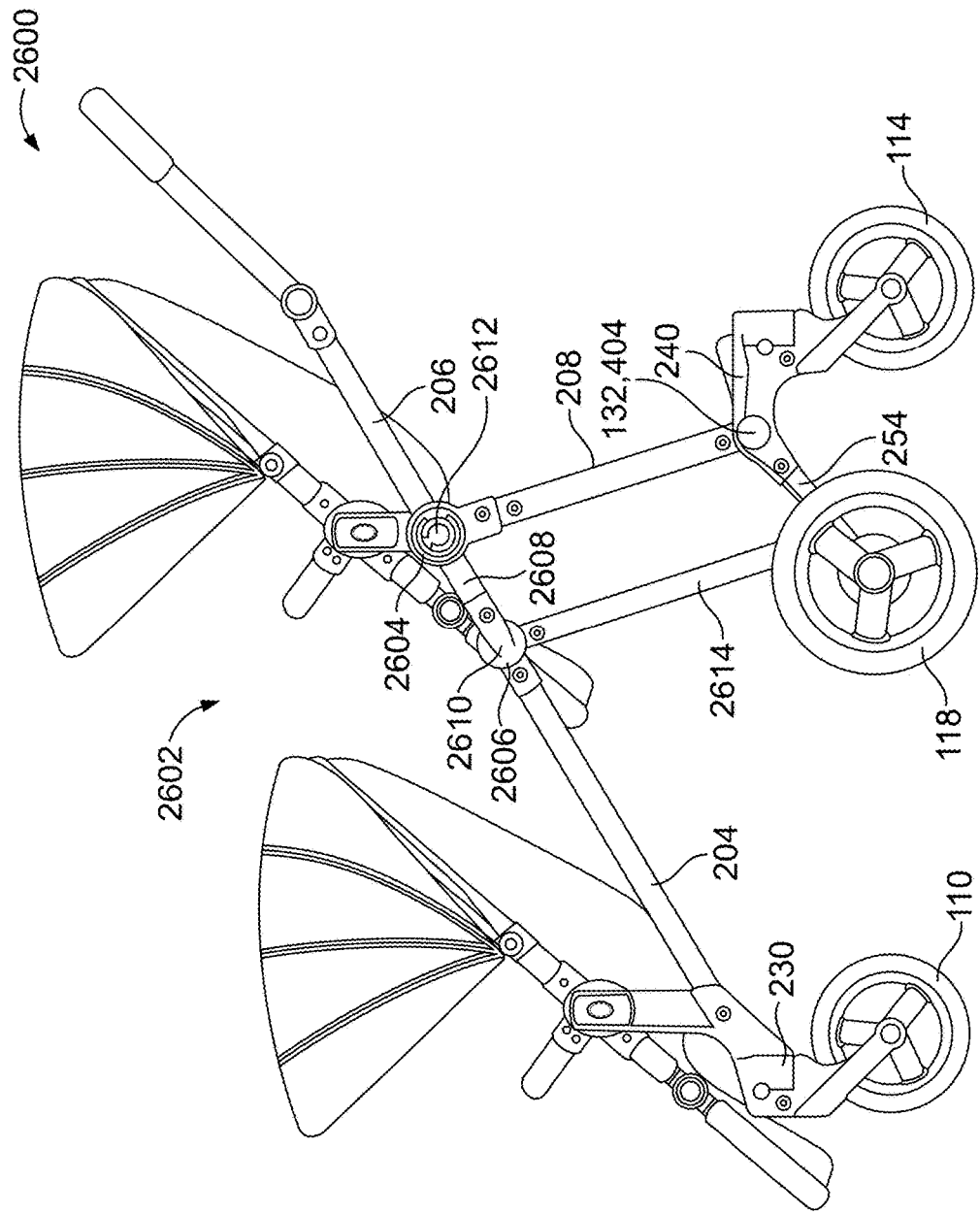
FIG. 26 is a side view of yet another example stroller constructed in accordance with the teachings of this disclosure.
Figures 27, 28:
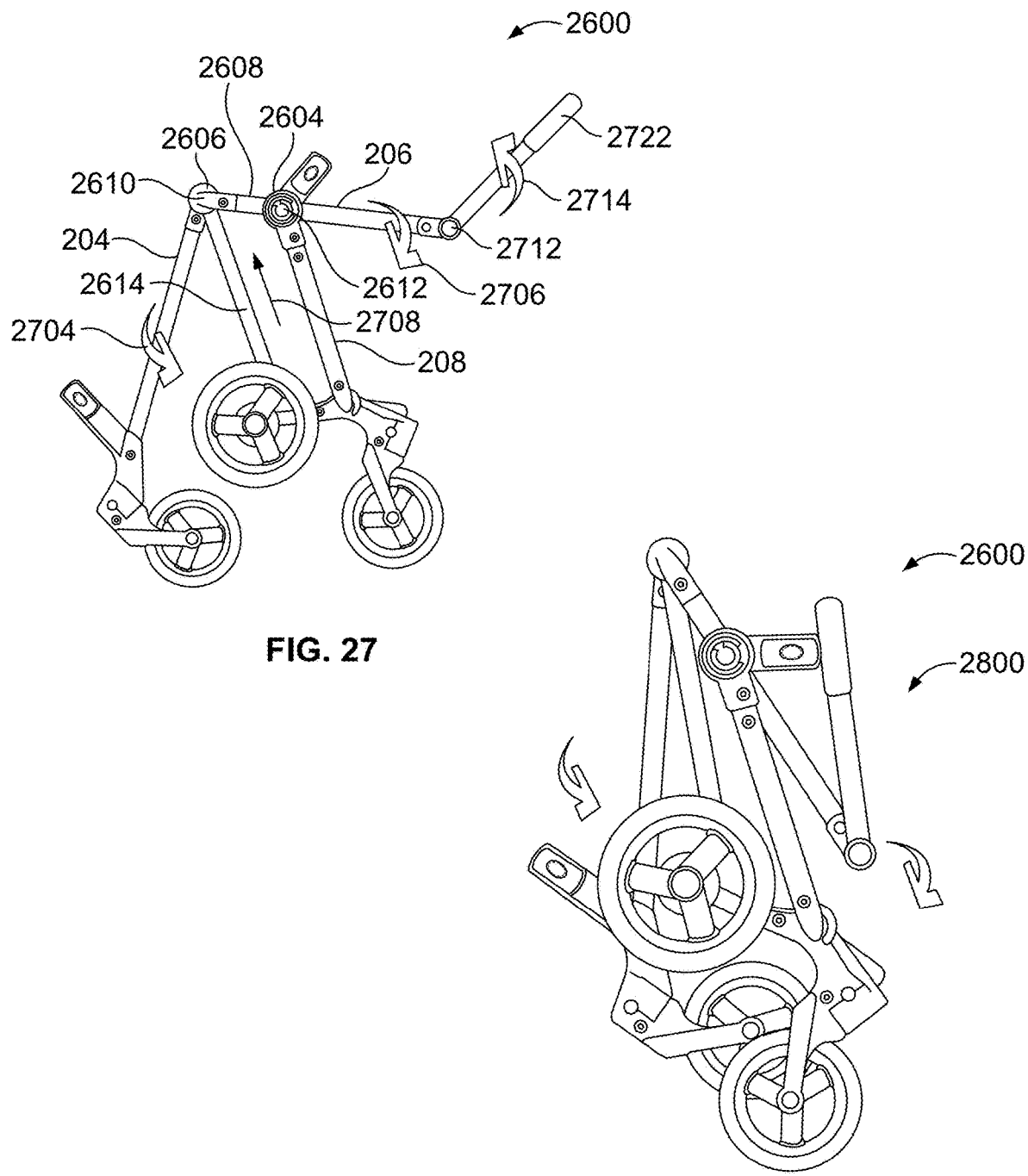
FIG. 27 is a side view of the example stroller of FIG. 26 showing the stroller partially collapsed.
FIG. 28 is a side view of the example stroller of FIGS. 26 and 27 showing the stroller fully collapsed.

FIGS. 26-28 illustrate another example stroller 2600 constructed in accordance with the teachings disclosed herein. Those components of the example stroller 2600 that are substantially similar or identical to the components of the example stroller 100 or 1600 described above and that have functions substantially similar or identical to the functions of those components will not be described in detail again below. Instead, the interested reader is referred to the above corresponding descriptions. To facilitate this process, similar reference numbers will be used for like structures.

The example stroller 2600 of the illustrated example employs a frame 2602 supported by one or more front wheels 110, one or more rear wheels 114 and one or more intermediate wheels 118. A front wheel housing 230 couples the front wheels 110 to the frame 2602. A carriage or carrier 240 pivotally couples the intermediate wheels 118 and the rear wheels 114 relative to the frame 2602. For example, the carriage 240 defines a pivot 404 about which the intermediate wheels 118 and the rear wheels 114 can pivot relative to the frame 2602.

The frame 2602 of the illustrated example defines side assemblies laterally spaced apart to define a seating area 104. Each of the side assemblies includes a lower frame support 204, an upper frame support 206 and an intermediate frame support 208. The intermediate frame support 208 is coupled to the upper frame support 206 via a connector 2604 (e.g., a hub). Unlike the frames 102 and 1602 described above, the upper frame support 206 is coupled to the lower frame support 204 via a pivot connector 2606. More specifically, the connector 2606 is positioned along a length of the upper frame support 206 such that the connector 2604 is spaced apart from the pivot connector 2606 by a distance 2608 defined by a portion upper frame support 206. The pivot connector 2606 of the illustrated example provides a pivot point 2610 to enable the lower frame support 204 to pivot relative to the upper frame support 206 and the connector 2604 of the illustrated example provides a pivot point 2612 to enable the upper frame support 206 to pivot relative to the intermediate frame support 208 when the stroller 2600 is folded. Thus, the intermediate frame support 208 is positioned adjacent or spaced away from the pivot point 2610 provided by the pivot connector 2606. The example stroller 2600 shown in FIG. 26 does not employ a suspension apparatus. However, in other examples, the example stroller 2600 includes a suspension apparatus (e.g., the suspension apparatus 128 or 1928 disclosed herein).

For the purpose of facilitating collapsing or folding the stroller 2600, the frame 2602 of the illustrated example employs an auxiliary frame member or rod 2614. The auxiliary frame member 2614 of the illustrated example has a first end coupled or attached the connector 2606 and a second end attached or coupled to an arm 254 of the carriage 240. The auxiliary frame member 2614 of the illustrated example is substantially parallel to the intermediate frame support 208. The auxiliary frame member 2614 of the illustrated example is pivotally coupled to the lower frame support 204 and to the upper frame support 206 via the pivot connector 2606.

FIGS. 27 and 28 illustrate the example stroller 2600 of FIG. 26 being folded from an in-use unfolded position shown in FIG. 26 to a collapsed, folded, or storage position 2800 shown in FIG. 28. The frame 2602 is constructed such that the entire stroller 2600 of the illustrated example is selectively moveable between an extended, unfolded, in-use position (FIG. 26) and a collapsed, folded, or storage position 2800 (FIG. 28). To collapse the stroller 2600 of the illustrated example, a latch release is activated via any suitable means (e.g., switch, lock release, pull cord, etc.) to unlock a latch mechanism and enable the frame supports 204, 206 and/or 208 and the auxiliary frame member 2614 to rotate or pivot relative to each other about the pivot 2610 provided by the pivot connector 2606 and the pivot 2612 provided by the connector 2604. In the illustrated example, the lower frame support 204 pivots toward the intermediate frame support 208 in a direction of arrow 2702 and the upper frame support 206 pivots toward the intermediate frame support 208 in a direction of arrow 2704.

More specifically, the upper frame support 206 pivots about the connector 2604 such that the portion 2608 of the upper frame support 206 extending between the connectors 2604 and 2606 acts as a lever. As the upper frame support 206 pivots toward the intermediate frame support 208 about the pivot 2612, the upper frame support 206 causes the auxiliary frame member 2614 to move in a direction of arrow 2708 (e.g., an upward direction). In turn, the auxiliary frame 2614 causes or pulls cause the arm 254 of the carriage 240 to pivot toward the intermediate frame support 208 in the direction shown by the arrow 2710. As a result, the carriage 240 of the illustrated example rotates about the pivot 140a, 404 toward the intermediate frame support 208 in the direction represented by arrow 2710 when folding the stroller 2600 to the folded position 2800. A handle 2722 of the frame 2602 may be rotated toward the upper frame support 206 about a pivot 2712 in the direction of arrow 2714.

As shown in FIG. 28, in the fully collapsed, folded or storage position 2800, the stroller 2600 of the illustrated example has a relatively low profile or dimensional envelope. While a collapsible frame 2602 is shown, some example strollers may not collapse.

Figure 29:
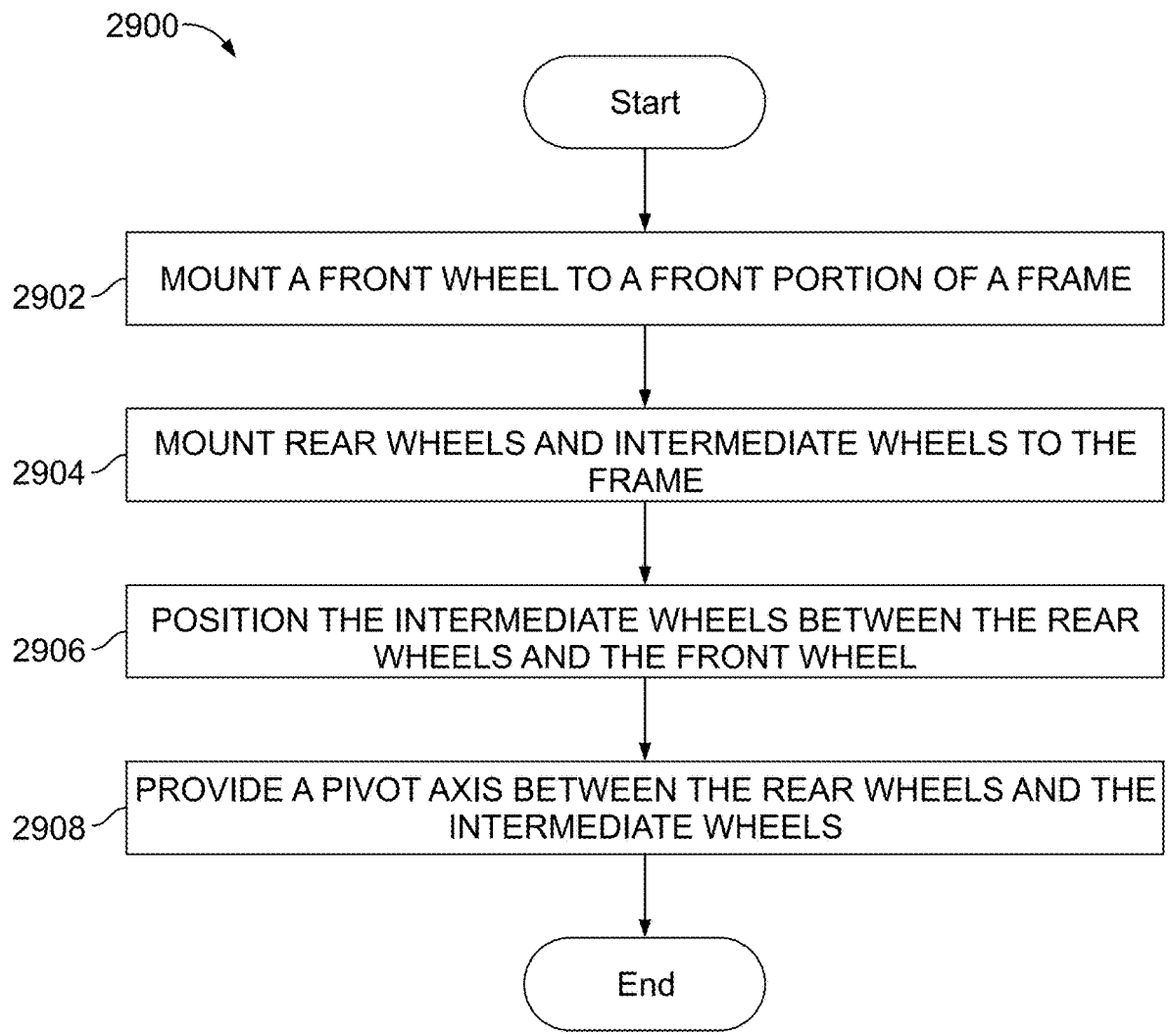
FIG. 29 depicts a flowchart of an example method to assemble an example stroller disclosed herein.

FIG. 29 is a flowchart of an example method 2900 that may be used to manufacture an example stroller such as the example stroller 100 of FIGS. 1-8, 9A, 9B and 10, the example stroller 1100 of FIG. 11, the example stroller 1200 of FIGS. 12-15, the example stroller 1600 of FIGS. 16-21, 22A-22D, 23, 24, 25A and 25B, and the example stroller 2600 of FIGS. 26-28. While an example manner of manufacturing the example covering assemblies, one or more of the blocks and/or processes illustrated in FIG. 29 may be combined, divided, re-arranged, omitted, eliminated and/or implemented in any other way. Further still, the example method of FIG. 29 may include one or more processes and/or blocks in addition to, or instead of, those illustrated in FIG. 29, and/or may include more than one of any or all of the illustrated processes and/or blocks. Further, although the example method 2900 is described with reference to the flow chart illustrated in FIG. 29, many other methods of manufacturing a stroller may alternatively be used.

To begin the example assembly process of FIG. 29, a front wheel is mounted to a front portion of a frame (block 2902). For example, the front wheels 110 of the illustrated examples disclosed herein are mounted to the lower frame support 204 via the front wheel housing 230.

A rear wheel and an intermediate wheel are also mounted to the frame (block 2904). More specifically, the intermediate wheel is positioned between the rear wheel and a rear wheel 114 are mounted to a first side frame assembly 202a, 1202a, 1802a, 2602a, via a first carriage 240, 1940 and a second set of an intermediate wheel 118 and a rear wheel 114 is mounted to a second side frame assembly 202b, 1202b, 1802b, 2602b via a second carriage 240, 1940.

A pivot axis is provided between the rear wheels and the intermediate wheels to enable the rear wheels and the intermediate wheels to pivot about the pivot axis (block 2808). For example, a pivot axis 132 is provided by an axle 130 extending between the first and second side frame assemblies 202a, 202b; 1202a, 1202b; 1802a, 1802b; 2602a, 2602b. In particular, a carriage 240, 1640 is mounted to each end of the axle 130 to pivotally mount the carriages 240, 1640 to the frame of the stroller. More specifically, the intermediate wheel 118 is mounted to the carriage 240, 1640 via an arm 254 and the rear wheel is mounted to the carriage 240, 1640 via a rear wheel housing 244. In some examples, the intermediate wheels 118 of the first and second side frame assemblies 202a, 202b; 1202a, 1202b; 1802a, 1802b; 2602a, 2602b are rotatably coupled together via an axle 120.

In some examples, an example stroller may be constructed with a suspension that provides an increased force when the stroller is rotated about the pivot axis 132 to lift a front end 112 of the stroller relative to a rear end 116. For example, an example stroller disclosed herein may be constructed with a suspension apparatus 128, 1928. For example, the suspension apparatus 128 is coupled or attached to the axle 130 or pivot axis 132 and the intermediate frame support 208. Alternatively, the suspension 1928 is attached to upper frame support 206 and the carriage 240, 1940 adjacent the intermediate frame support 208.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:
1. A stroller comprising:
a frame including:
    an upper frame;
    an intermediate frame;
    a lower frame; and
    a handle coupled to the upper frame;
a front wheel coupled to the lower frame;
an intermediate wheel having an axis of rotation;
a rear wheel, the intermediate wheel located between the front wheel and the rear wheel, the intermediate wheel and the rear wheel coupled to the upper frame via the intermediate frame;
a pivot axis, the intermediate frame rotatably coupled to the upper frame about the pivot axis, the pivot axis offset above and forward relative to the axis of rotation;
a first seat removably couplable to the frame at a first height; and
a second seat removably couplable to the frame at a second height, the second height different than the first height.

2. The stroller of claim 1, further including a boogie, the rear wheel coupled to the intermediate wheel via the boogie.

3. The stroller of claim 1, wherein the intermediate wheel is positioned from the front wheel a first distance when the stroller is in an expanded position, and the intermediate wheel is positioned from the rear wheel a second distance when the stroller is in the expanded position, the second distance less than the first distance.

4. The stroller of claim 1, wherein the intermediate wheel is vertically aligned with the first seat from a side view of the stroller.

5. The stroller of claim 1, wherein the pivot axis is a first pivot axis, the stroller further including a second pivot axis, the handle coupled to the upper frame via the second pivot axis.

6. The stroller of claim 1, wherein the lower frame is curved.

7. The stroller of claim 1, wherein the rear wheel is a first rear wheel, the stroller further including a second rear wheel, the first rear wheel rotatably independently of the second rear wheel.

8. The stroller of claim 7, wherein the first rear wheel and the second rear wheel are swivelable.

9. The stroller of claim 8, wherein the front wheel is a first front wheel, the intermediate wheel is a first intermediate wheel, the stroller further including a second front wheel and a second intermediate wheel, the first front wheel and the second front wheel are swivelable, the first intermediate wheel and the second intermediate wheel are fixed against swiveling.

10. The stroller of claim 1, further including a first seat mount pivotably coupled to the frame and a second seat mount pivotably coupled to the frame, the second seat removably couplable to the first seat mount and the second seat mount.

11. The stroller of claim 10, wherein the first seat mount and the second seat mount are coupled to the lower frame.

12. The stroller of claim 11, further including a third seat mount coupled to the frame, a fourth seat mount couple to the frame, the first seat removably couplable to the third seat mount and the fourth seat mount.

13. The stroller of claim 10, wherein the first seat mount includes a tab engageable with a recess to hold the first seat mount in a deployed position.

14. The stroller of claim 1, wherein the intermediate wheel has a first diameter and the front wheel has a second diameter, the second diameter smaller than the first diameter.

15. The stroller of claim 1, wherein the front wheel is a first front wheel, the intermediate wheel is a first intermediate wheel, the stroller further including a second front wheel and a second intermediate wheel, the first front wheel and the second front wheel are separated a first distance, the first intermediate wheel and the second intermediate wheel are separated a second distance, the second distance greater than the first distance.

16. The stroller of claim 1, wherein the rear wheel is a first rear wheel, the intermediate wheel is a first intermediate wheel, the stroller further including a second rear wheel and a second intermediate wheel, the first rear wheel and the second rear wheel are separated a first distance, the first intermediate wheel and the second intermediate wheel are separated a second distance, the second distance greater than the first distance.

17. The stroller of claim 1, further including a brake, the brake supported about an axis forward of the rear wheels.

18. The stroller of claim 1, wherein the intermediate frame is pivotable relative to the upper frame about the pivot axis while the front wheel is elevated.

19. The stroller of claim 1, wherein the intermediate frame is pivotable relative to the rear wheel while the front wheel is elevated and the intermediate wheel and rear wheel are grounded.

20. A stroller comprising:

an upper frame;

an intermediate frame;

a lower frame, the lower frame being curved;

a handle coupled to the upper frame;

a first front wheel coupled to the lower frame;

a second front wheel coupled to the lower frame, the first front wheel and the second front wheel being swivelable;

a first intermediate wheel having an axis of rotation, the first intermediate wheel having a first diameter, the first intermediate wheel being positioned from the first front wheel a first distance when the stroller is in an expanded position;

a second intermediate wheel, the first intermediate wheel and the second intermediate wheel being fixed against swiveling;

a first rear wheel, the first intermediate wheel located between the first front wheel and the first rear wheel, the first intermediate wheel and the first rear wheel coupled to upper frame via the intermediate frame, the first rear wheel having a second diameter, the second diameter less than the first diameter, and the first intermediate wheel being positioned from the first rear wheel a second distance when the stroller is in the expanded position, the second distance less than the first distance;

a second rear wheel, the first rear wheel rotatable independently of the second rear wheel, the first rear wheel and the second rear wheel being swivelable;

a first pivot axis, the intermediate frame rotatably coupled to the upper frame about the first pivot axis, the first pivot axis offset above and forward to the axis of rotation, the intermediate frame being pivotable relative to the upper frame about the first pivot axis while the first front wheel is elevated;

a second pivot axis, the handle coupled to the upper frame via the second pivot axis;

a first seat, the first intermediate wheel and the second intermediate wheel vertically aligned with the first seat from a side view of the stroller;

a first bayonet seat mount pivotably coupled to the lower frame;

a second bayonet seat mount pivotably coupled to the lower frame;

a second seat removably couplable to the first bayonet seat mount and the second bayonet seat mount, wherein the second seat is at a vertical position lower than the first seat when the second seat and the first seat are coupled to the frame; and a brake, the brake supported about an axis forward of the first and second rear wheels.

* * * * *